United States Patent [19]
Nichols

[11] Patent Number: 5,404,499
[45] Date of Patent: Apr. 4, 1995

[54] SEMI-AUTOMATIC PROGRAM EXECUTION ERROR DETECTION

[75] Inventor: John L. Nichols, Santa Clara, Calif.

[73] Assignee: Logical Services Incorporated, Santa Clara, Calif.

[21] Appl. No.: 981,326

[22] Filed: Aug. 24, 1992

Related U.S. Application Data

[63] Continuation of Ser. No. 469,660, Jan. 24, 1990, abandoned.

[51] Int. Cl.[6] .............................................. G06E 11/28
[52] U.S. Cl. ............................. 395/575; 364/DIG. 1; 364/265.3; 364/265.6; 364/266; 371/571; 371/60
[58] Field of Search .......................... 371/19, 57.1, 60; 395/575, 425

[56] References Cited

U.S. PATENT DOCUMENTS

| | | | |
|---|---|---|---|
| 3,562,717 | 2/1971 | Harmon et al. | 395/425 |
| 4,890,223 | 12/1989 | Cruess et al. | 364/200 |

FOREIGN PATENT DOCUMENTS

| | | | |
|---|---|---|---|
| 148958 | 8/1984 | Japan | 371/60 |

OTHER PUBLICATIONS

Lazzerini et al., "A Programmable Debugging Aid for Real-Time Software Development", *IEEE Micro*, Jun. 1986, pp. 34–42.

Feustel, E., "On the Advantages of Tagged Architecture", *IEEE Trans. on Computers*, vol. C-22, No. 7, Jul. 1973, pp. 644–656.

Johnson, M., "Some Requirements for Architectural Support of Software Debugging", *Proc. Symp. on Architectural Support for Programming Languages and Operating Systems*, Mar. 1-3, 1982, Palo Alto, Calif., pp. 140–148.

Grappel, R., "Extend MP capabilities with a memory-management IC", *EDN*, Feb. 3, 1983, pp. 123–130.

*Primary Examiner*—Stephen M. Baker
*Attorney, Agent, or Firm*—Skjerven, Morrill, MacPherson, Franklin & Friel

[57] ABSTRACT

A system for generating an early indication of a fault in the operation of a computer program is described. In one embodiment, each location in a computer's memory space is assigned a code indicating the conditions under which the programmer expects the memory location to be accessed during the program's execution. When a memory location is accessed, the control/status signals generated by the CPU are compared to the assigned code. If the type of access, as indicated by the control/status signal, does not conform to the expected type of access, as indicated by the assigned code, an output is generated to indicate that a fault has occurred in the operation of the program. In another embodiment, a truncated numerical difference between the present memory address and the immediately previous memory address is generated. This difference is used along with the assigned code and the control/status signal to determine whether access to the present memory address is unexpected. Once again, if the access is unexpected, an output is generated to so indicate. The system allows the detection of a fault in program operation before an incorrect output is generated. The system is useful in applications such as fault detection during the development of a computer program or computer based controller, or monitoring the operation of a critical computer based controller.

25 Claims, 13 Drawing Sheets

SEMI-AUTOMATIC PROGRAM EXECUTION ERROR DETECTION

This application is a continuation of application Ser. No. 07/469.660, filed Jan. 24, 1990, abandoned.

FIELD OF THE INVENTION

This invention relates to structure and method for generating an early indication of a failure in the operation of a computer program, or a computer based controller and more particularly to the early detection of a failure in a computer program or a computer based controller by testing every memory access, and machine cycle performed during the program's execution for a departure from the memory access and machine cycle sequence expected by the programmer.

PRIOR ART

Heretofore, the primary method used to detect a failure in the execution of a computer program or the operation of a computer based controller, was by comparing output signals generated in response to input signals against the output signals expected by the programmer.

The objective of a computer program, or computer based controller is to implement a specified Input/Output function.

With very few exceptions, when a program is executed to implement an Input/Output function, each output signal is generated as a result of a long complex sequence of internal operation. If any one of the internal operations required to generate the correct output signal fails to perform the function it is expected to perform, an incorrect output signal will be generated, and the program will fail to implement the Input/Output function the programmer expected it to perform.

The failure of an internal operation to perform the function it is expected to perform may be due to: a program coding error, an error in the design or construction of the hardware, electrical noise, or a failed component.

In most cases, after an internal operation fails to implement the function it is expected to perform, a significant amount of time may elapse, and many internal operations will have been performed before an incorrect output signal is generated due to the failure.

It is very difficult, in almost all cases, to determine from an incorrect output signal which internal operation failed to perform the function it was expected to perform.

During the development of a computer program or a computer based controller a significant amount of time is spent searching for the faulty internal operation that resulted in the generation of an incorrect output. In almost all cases, the search is started from the point in the execution of the program when an incorrect output is generated.

In some applications, the failure of a computer based controller to operate properly may result in significant damage, or loss of life. In a critical application, a fault in the operation of a computer based controller must be detected before the controller generates a faulty output.

Heretofore, a "Watch Dog Timer" was a common method used to detect a failure of a critical non-redundant computer based controller to operate as required.

The "Watch Dog Timer" is expected to be restarted at a regular interval by the program, before the time it is set for expires. If the "Watch Dog Timer" times-out it is a certain (but often not an early) indication of a failure. Before the "Watch Dog Timer" times-out, indicating a failure, it is possible for the program to generate an incorrect output signal.

In many cases, a simple .real time program for starting the Watch Dog Timer will consist of a loop of program segments, and subroutine Calls as illustrated below.

```
MAIN:       CALL SUB0; Call first subroutine. (program
     segment 0 )
            CALL SUB1; Call second subroutine.
            CALL SUB2; Call third subroutine. (program
            segment 1)
            * * * Sequence of Subroutine Calls and Program
            segments.
            CALL SUBN; Call last operation subroutine.
            CALL RWDT; Call Restart Watch Dog Timer.
            JMP MAIN; Go Back to top of MAIN loop.
```

In a more complex example, a Task Dispatcher program selects the next subroutine to be executed, based upon flags set by interrupt programs. After each subroutine is executed the Task Dispatcher restarts the Watch Dog Timer.

The time out of the Watch Dog timer will in most applications be used to Reset the CPU or generate a non-maskable Interrupt. The Reset, or Interrupt program will set outputs to a safe state, and generate an output indicating the system has failed.

A Watch Dog Time can only detect when the program loses control of the program counter. When control of the program counter is lost, an output program may be executed generating an incorrect output before the Watch Dog Timer times out.

Many types of program execution faults that may result due to a failed component, or electrical noise will NOT be detected by a Watch Dog Timer.

A Watch Dog Timer can not detect Data Read or Write accesses by the program to an incorrect memory location, or a minor deviation from the expected instruction execution sequence.

An incorrect Data memory location access, or a slight deviation from the expected instruction execution sequence may result if the CPU reads an incorrect Instruction Op-Code or Operand from the Instruction/Data bus.

During the system's operation, there is high probability that a failure of a component, or interference by electrical noise will result in a memory access unexpected by the programmer before an incorrect output is generated by the system.

Or during the system's operation, an input sequence not provided during the fault location process may result in a memory access unexpected by the programmer.

The use of a Watch Dog Timer is analogous to a Night Watch Man making periodic inspections of all the doors and windows in a building, while the automatic testing of every memory access in accordance with this invention is analogous to the installation of a burglar alarm system that continuously tests all doors and window.

SUMMARY OF THE INVENTION

The method and structure in accordance with this invention reduces the amount of time required to locate many common types of coding or hardware faults by automatically testing every memory access during the program's execution for conformity to the memory access sequence expected by the programmer, which is clearly defined by the coding of the program. Inherent in the coding of a program is a definition of when the programmer expects each memory location to be accessed during the program's execution.

An access to a memory location during a program's execution that does not conform to the sequence expected by the programmer is a certain and early indication of a fault, and a program execution history trace terminated when this occurs is certain to provide information relevant to the location or type of the fault.

Many common coding and hardware faults result in an unexpected access to a memory location significantly prior to the generation of an incorrect output by the program. Less time will be required to find a coding or hardware fault if the search for the fault is started from the point in the execution of the program where an unexpected memory access occurred.

In accordance with this invention, a definition of a program, and the instruction set of the CPU on which the program is run, is converted into a definition of the memory access, and machine cycle sequence expected by the programmer during the program's execution. During the program's execution, by hardware or a software execution simulator, every memory access, and machine cycle is tested for a departure from the memory access and machine cycle sequence expected by the programmer. When a memory access or machine cycle departs from the sequence expected by the programmer, a Fault indication is generated and when, due to the program's execution, the programmer's expectations in regards to when a memory location will be accessed changes, the memory location's expected access sequence definition is updated to the new programmer's expectation.

This invention has particular utility in locating the source of certain types of errors in the coding of a program during its development, or in the programming, design, and/or construction of a computer based controller during its development. When a computer based controller is used in a critical application (in which the generation of an incorrect output could result in the loss of life, or significant property damage), the method of this invention can be used to generate a signal indicating a failure in the controller's operation before an incorrect output is generated. This signal can be used to force the outputs of the controller to a safe condition and to provide an alarm.

There are two primary applications for this invention:

1. Fault location during development of a computer program or a computer based controller, and 2. Monitoring the operation of a critical computer based controller.

DETAILED DESCRIPTION

Figure 1:
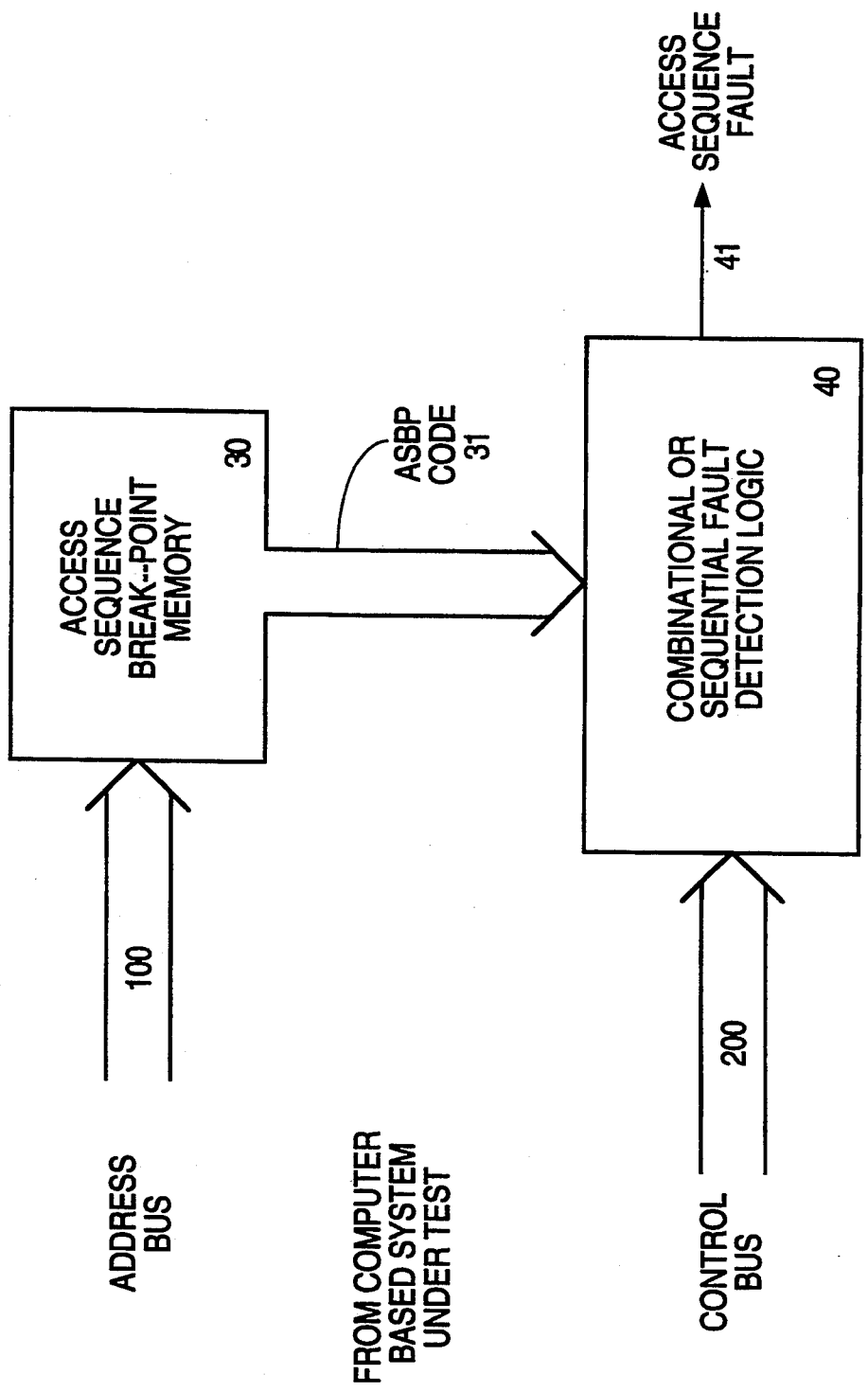
FIG. 1 shows a basic semi-automatic program execution error detector consisting of an access sequence break-point memory 30 and a combinational or sequential fault detection logic 40.

As shown in FIG. 1, basic Semi-automatic Program Execution Error Detector consists of an ACCESS SEQUENCE BREAK-POINT MEMORY 30 and a COMBINATIONAL, OR SEQUENTIAL FAULT DETECTION LOGIC 40.

The ACCESS SEQUENCE BREAK-POINT MEMORY 30 assigns to every location in the computer's memory space an Access Sequence Break-Point "ASBP" code 31 indicating when the programmer expects the memory location will be accessed during the program's execution. The Computer's ADDRESS BUS 100 provides the address to the ACCESS SEQUENCE BREAK-POINT MEMORY 30, selecting the ASBP code 31 assigned to the memory location accessed by the computer.

The selected ASBP code 31 output is provided as an input to the COMBINATIONAL OR SEQUENTIAL FAULT DETECTION LOGIC 40.

The COMBINATIONAL, OR SEQUENTIAL FAULT DETECTION LOGIC 40 generates an ACCESS SEQUENCE FAULT output 41 as a function of: inputs from the Computer's CONTROL BUS 200; the ASBP code 31 selected by the Computer's ADDRESS BUS 100; and if the fault detection logic is sequential, the present state of the logic.

Figure 2:
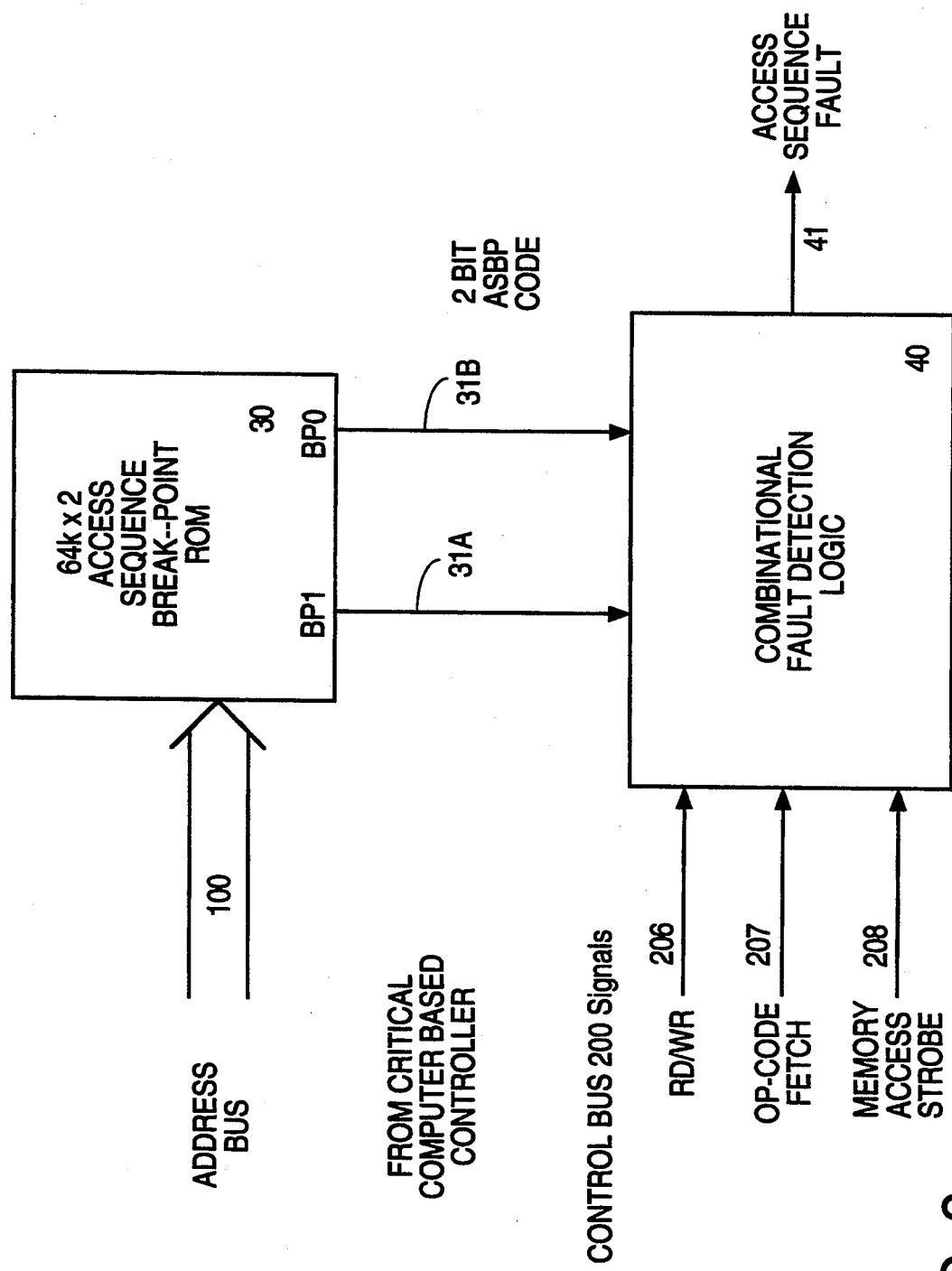
FIG. 2 shows a semi-automatic program execution error detector with ROM access sequence break-point memory for monitoring critical computer-based controller.

As shown in FIG. 2, when a Semi-automatic Program Error Detector is used to monitor the operation of a critical computer based controller, a ROM may be used for the ACCESS SEQUENCE BREAK-POINT MEMORY 30. With a 2 bit Access Sequence Break-Point code 31A & 31B the programmer's memory access sequence expectations may be encoded as shown in Table A.

TABLE A

Two bit Basic Access Sequence Break-Point set.

| 31A | 31B | |
|---|---|---|
| BP1 | BP0 | Programmer's Expectations. |
| L | L | No access expected. |
| L | H | Op-Code access only expected. |
| H | L | Read Only access expected. |
| H | H | Data Read or Write access expected. |

With commonly available CONTROL BUS signals: RD/WR 206 (R/W); an OP-CODE FETCH 207 (OCF); and a MEMORY ACCESS STROBE 208 (MAS), the TRUTH TABLE for the ACCESS SEQUENCE FAULT 41 (ASF) output is shown in Table B:

TABLE B

Truth Table for Combinational Fault Detection Logic:

| 208 MAS | 206 R/W | 207 OCF | 31A BP1 | 31B BP0 | : | 41 ASF | |
|---|---|---|---|---|---|---|---|
| F | X | X | X | X | | F | Not a Memory Access |
| T | X | F | H | H | | F | Expected Read or Write Access. |
| T | R | F | H | X | | F | Expected Read Access. |
| T | R | T | L | H | | F | Expected Op-Code Fetch. |
| T | X | X | L | L | | T | No Access Expected. |
| T | X | T | H | X | | T | Unexpected Access for an Op-Code. |
| T | W | F | H | L | | T | Unexpected Write Access. |
| T | X | F | L | H | | T | Unexpected Data Read or Write to an Op-Code Memory Location. |

The ACCESS SEQUENCE FAULT output 41 is True if the CPU accesses a memory location the programmer does not expect to be accessed, i.e., accesses a Data memory location for an Op-Code, performs a Write access to a Read Only expected memory location, or accesses an Op-Code memory location as Data.

Each of these conditions is a certain and early indication of a fault in the program's execution. The ACCESS SEQUENCE FAULT output 41 can be used to force the outputs of the Critical Computer Based Controller to a safe state; generate a Reset, or Non-Maskable interrupt to the CPU; and/or activate an alarm.

Figure 3:
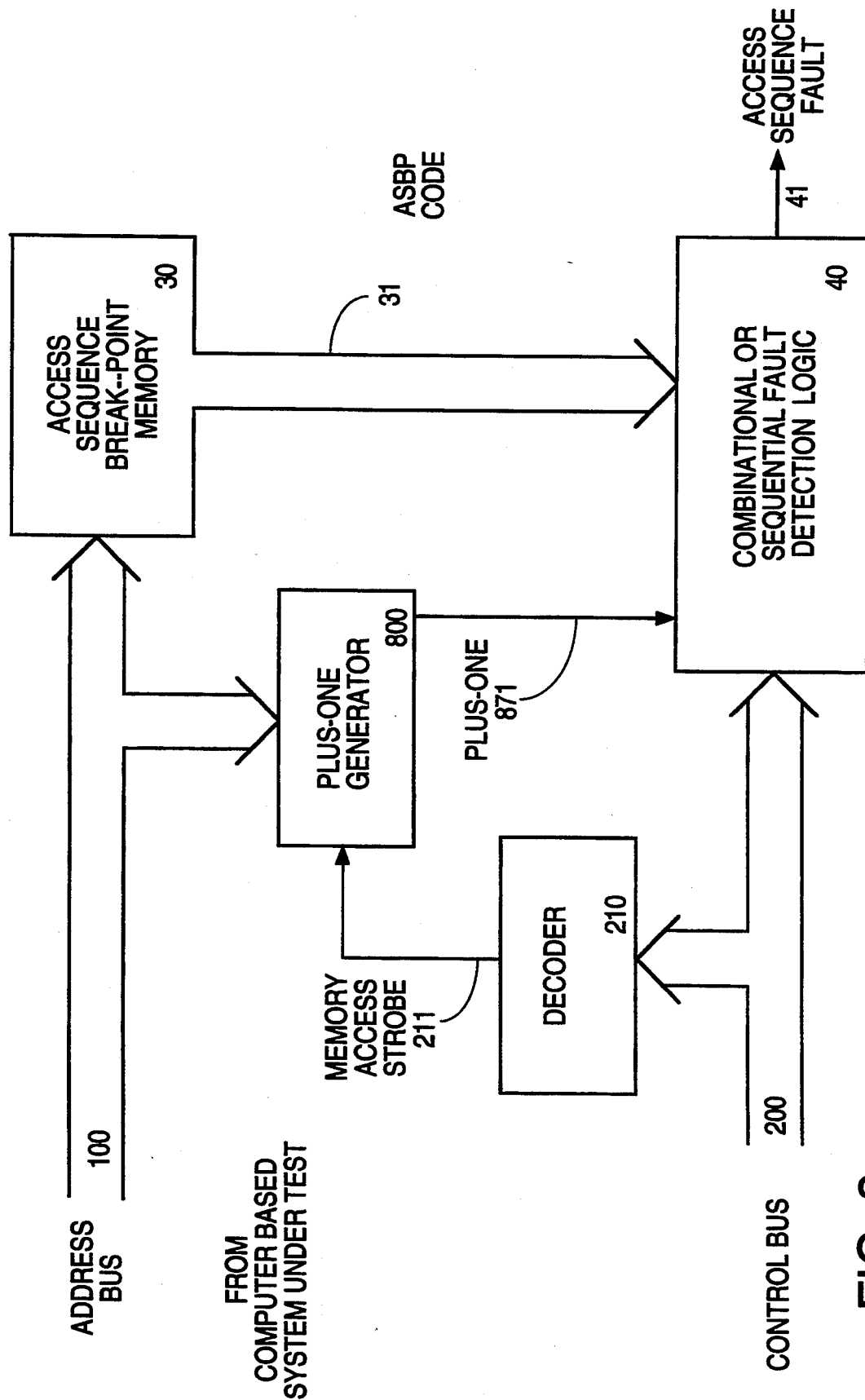
FIG. 3 shows a semi-automatic program execution error detector with plus-one memory address generator.

Since a majority of the memory accesses during the execution of a program are to sequential memory locations, the error detection capability of a Semi-automatic Program Execution Error Detector can be enhanced by adding a PLUS-ONE GENERATOR 800 as shown in FIG. 3, to detect when the present memory address is one greater than the last.

When required, a DECODER 210 generates a MEMORY ACCESS STROBE 211 from the Computer's BUS 200 to provide a clock to the PLUS-ONE GENERATOR 800. The signals on the Control Bus generated by some CPUs includes a signal indicating when the Memory Address Bus, Memory Access Type signals are valid. This signal may be used directly without a decoder to provide the MEMORY ACCESS STROBE 211.

During a program's execution the programmer expects some memory locations will only be accessed in sequence, and some will never be accessed in sequence. As an example, some CPU's are expected to access memory location assigned an Instruction's Operand only when the present memory address is one greater than the last. The programmer expects some data memory locations will only be accessed when the PLUS-ONE signal 871 is False, and some data memory locations are only expected to be accessed when the PLUS-ONE signal 871 is True.

With the PLUS-ONE 871 signal output from the PLUS-ONE GENERATOR 800 provided as an input to the COMBINATIONAL OR SEQUENTIAL FAULT DETECTION LOGIC 40, and the programmer's sequential memory access expectations for each memory location encoded in the ASBP codes 31, the COMBINATIONAL OR SEQUENTIAL FAULT DETECTION LOGIC 40 can generate an ACCESS SEQUENCE FAULT 41 if a memory access departs from the programmer's sequential memory access expectations.

Figure 4:
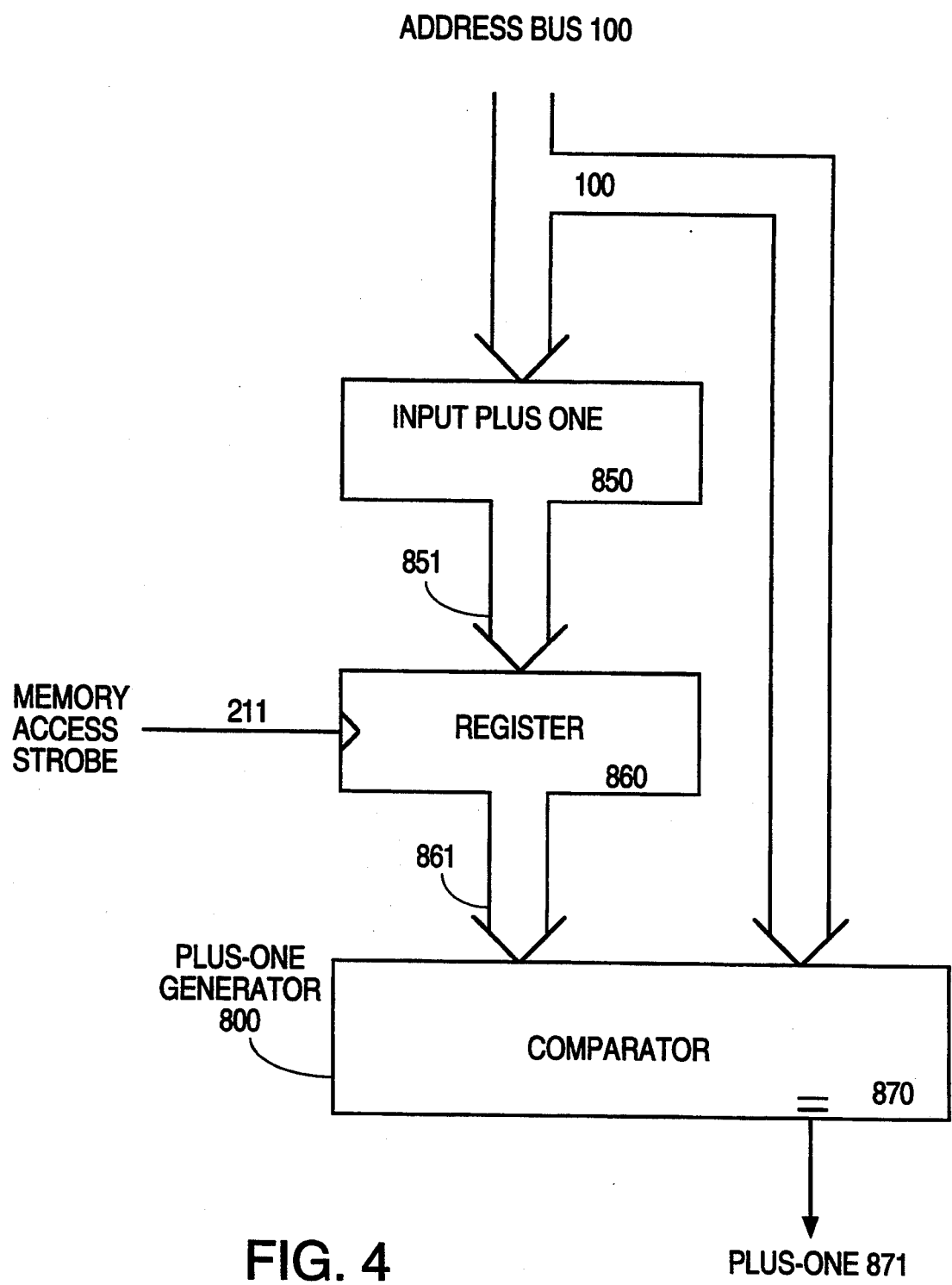
FIG. 4 shows a plus-one generator whose output is true when the present memory address is one greater than the last.

As shown in FIG. 4, the INPUT PLUS ONE 850 generates an output value 851 that is one greater than the value of the ADDRESS BUS 100 input. At the end of each memory access the value of the ADDRESS BUS 100 plus one is loaded into the REGISTER 860. The 861 output of the REGISTER 860, and the ADDRESS BUS 100 provide the inputs to the COMPARITOR 870. The PLUS-ONE output 871 of the COMPARATOR 870 is True if the Present ADDRESS BUS 100 input is one greater than the last ADDRESS BUS 100 input to the PLUS-ONE GENERATOR 800.

Figure 5:
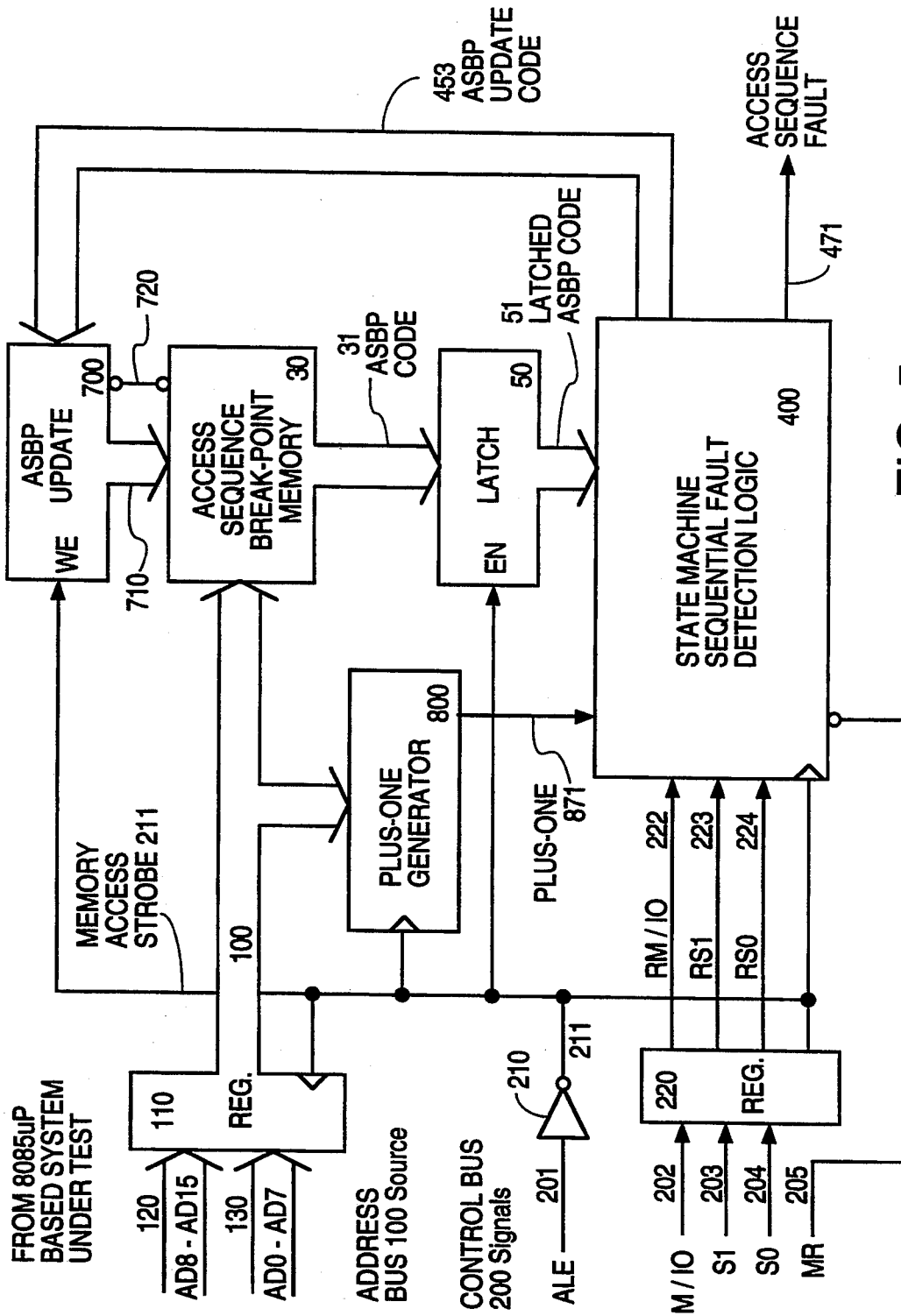
FIG. 5 shows a semi-automatic program execution error detector for an 8085 microprocessor based computer.

As shown in FIG. 5, A Semi-automatic Program Execution Error Detector for an 8085 uP based computer is shown. This design includes the capability to change (Update) Access Sequence Break-Points codes 31 stored in the ACCESS SEQUENCE BREAK-POINT MEMORY 30 during the program's execution.

The STATE MACHINE SEQUENTIAL FAULT DETECTION LOGIC 400 (shown in FIG. 6) generates an ACCESS SEQUENCE BREAK-POINT UPDATE CODE 453 in addition to the ACCESS SEQUENCE FAULT output 471.

All operations are synchronized by the MEMORY ACCESS STROBE 211, which is generated by the inverter 210, inverting the Address Latch Enable (ALE) 201 signal from the 8085's CONTROL BUS 200.

The completion of the last 8085 machine cycle, and the start of the next machine cycle is indicated by a low to high transition of the MEMORY ACCESS STROBE 211. The majority of 8085 machine cycles are used to access memory. Status signals generated by the CPU, and provided by the CONTROL BUS 200: M/IO 202; S1 203; and S0 204, indicate the type of each machine cycle as shown in Table C.

TABLE C

8085 Machine Cycle Type Status Signals:

| 202 M/IO | 203 S1 | 204 S0 | MACHINE CYCLE TYPE |
|---|---|---|---|
| TS | L | L | Halt (TS = Three State) |
| L | L | H | Memory Write |
| L | H | L | Memory Read |
| L | H | H | Op-Code Fetch |
| H | L | H | I/O Write |
| H | H | L | I/O Read |
| H | H | H | Interrupt Acknowledge |

On each low to high transition of the MEMORY ACCESS STROBE 211; the CPU's memory address (A08 43 A15 120, and AD0→AD7 130) is loaded into register 110; the Status signals (M/IO 202, S1 203, S0 204 ) from the CONTROL BUS 200 are loaded into register 220; the REGISTER 880 in the PLUS-ONE GENERATOR 800 is loaded with the last ADDRESS BUS 100 value plus one; and the STATE REGISTER 460 in the STATE MACHINE SEQUENTIAL FAULT DETECTION LOGIC 400 (shown in FIG. 6) is loaded from the NEXT STATE output 451 of the STATE MACHINE ROM 450.

During each machine cycle the output of register 110 provides the ADDRESS BUS 100 to the ACCESS SEQUENCE BREAK-POINT MEMORY 30, (which selects the ASBP CODE 31 assigned to the memory location) and the PLUS-ONE GENERATOR 800; the high MEMORY ACCESS STROBE 211 enables the LATCH 50 to pass the ASBP CODE 31 (as the LATCHED ASBP CODE 51 output of LATCH 50) to the STATE MACHINE SEQUENTIAL FAULT DETECTION LOGIC 400; the PLUS-ONE 871 output from the PLUS-ONE GENERATOR 800 is provided as an input to the STATE MACHINE SEQUENTIAL FAULT DETECTION LOGIC 400 indicating if the present memory address is one greater than the last; and the Status signals loaded from the CONTROL BUS 200 into register 220 (RM/IO 222, RS1 223, RS0 224) are provided as inputs to the STATE MACHINE SEQUENTIAL FAULT DETECTION LOGIC 400.

As a function of the above listed inputs, and its present state, the STATE MACHINE SEQUENTIAL FAULT DETECTION LOGIC 400 generates two outputs; the ACCESS SEQUENCE FAULT 471, and an ASBP UPDATE CODE 453. The ASBP UPDATE CODE 453 output selects the operation performed by the ASBP UPDATE 700, when the MEMORY ACCESS STROBE 211 goes low. The ASBP UPDATE CODE 453 indicates if an update of the ASBP code is required, and if required it selects the update ASBP code to write into the ACCESS SEQUENCE BREAK-POINT MEMORY 30.

When the MEMORY ACCESS STROBE 211 goes low LATCH 50 is disabled, to hold the selected ASBP CODE 31 to the STATE MACHINE SEQUENTIAL FAULT DETECTION LOGIC 400 and if an update is indicated by the ASBP UPDATE CODE 453, the new ASBP code is provided to the ACCESS SEQUENCE BREAK-POINT MEMORY 30 by the data output 710 of the ASBP UPDATE 700, and the WR signal 720 is activated by the low MEMORY ACCESS STROBE 211 input.

Figure 6:
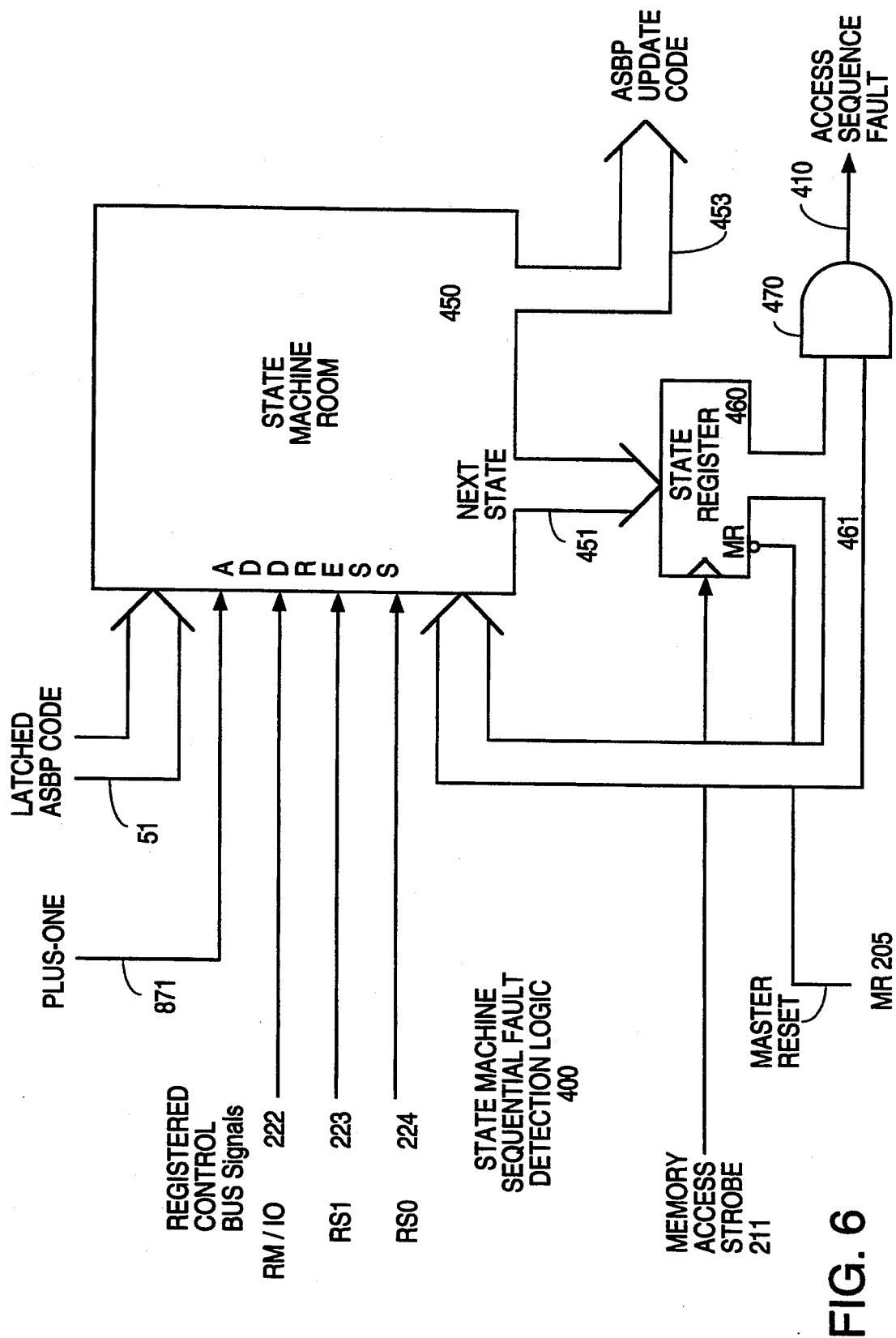
FIG. 6 shows state machine sequential fault detection logic for the 8085 microprocessor semi-automatic program execution error detector.
Figure 7:
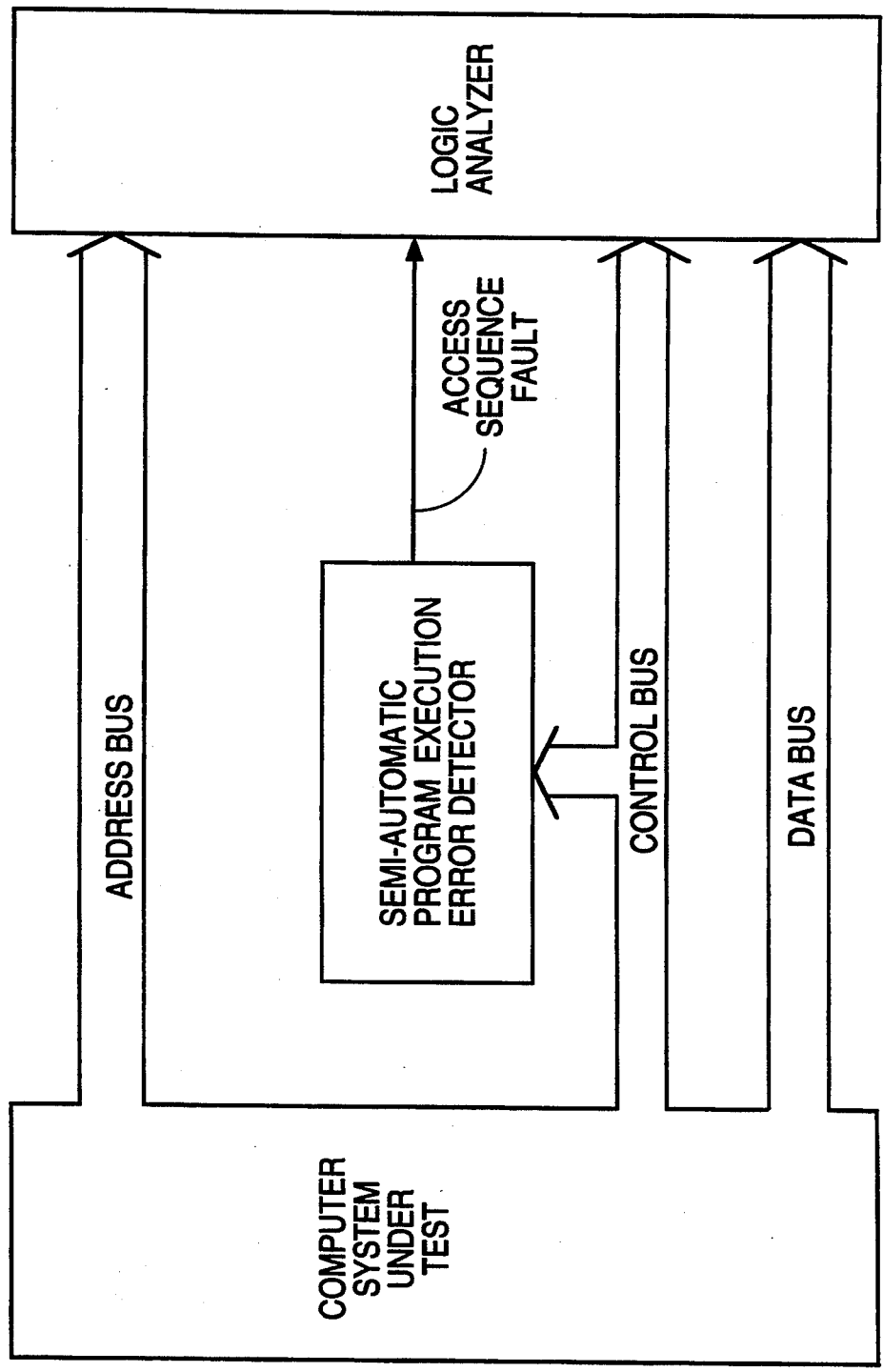
FIG. 7 shows the output from a computer system under test to assist in the debugging of a Program or a Computer Based Controller. The Logic Analyzer is set up to terminate the collection of a Program Execution History trace when the ACCESS SEQUENCE FAULT output goes True.
Figure 8:
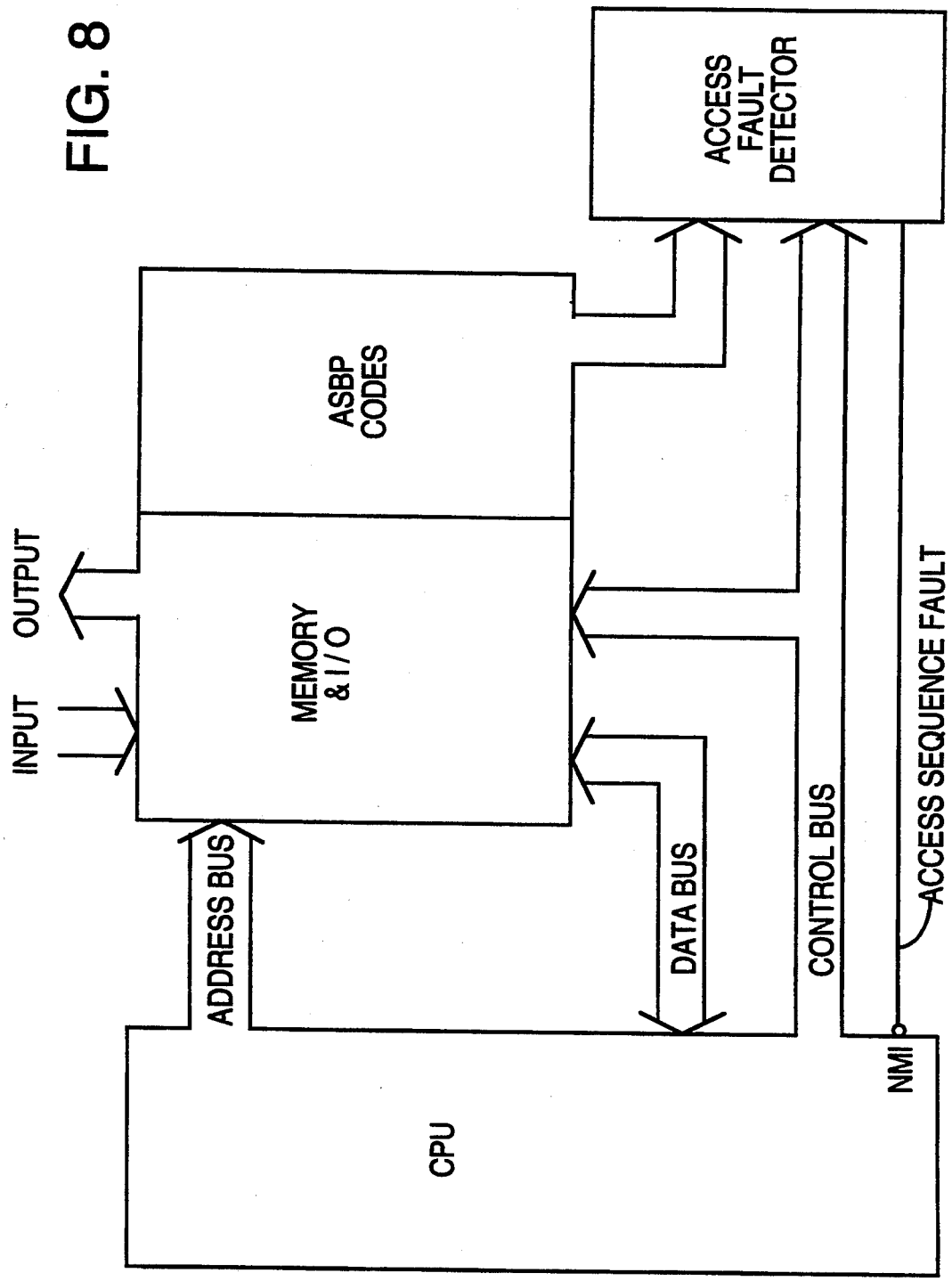
FIG. 8 shows the inclusion of a Semi-automatic Program Execution Error Detector in the design of a Critical Computer Based Controller. The ASBP memory is provided by extending the width of the computer's memory, and the ACCESS SEQUENCE FAULT output is connected to generate a Non-Maskable Interrupt.
Figure 9:
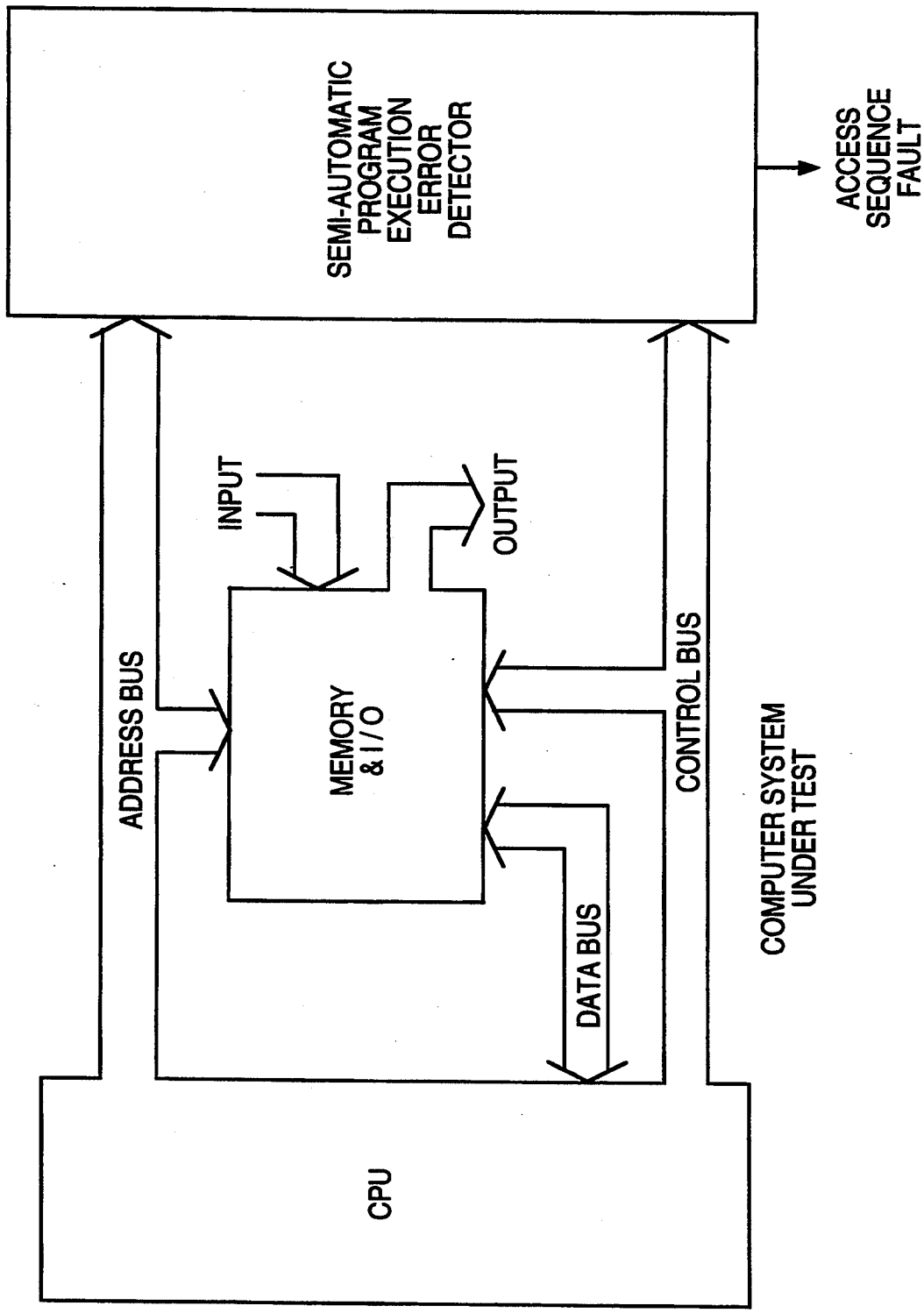
FIG. 9 shows the Semi-automatic Program Execution Error Detector added to a Critical Computer Based Controller as a separate section.
Figure 10:
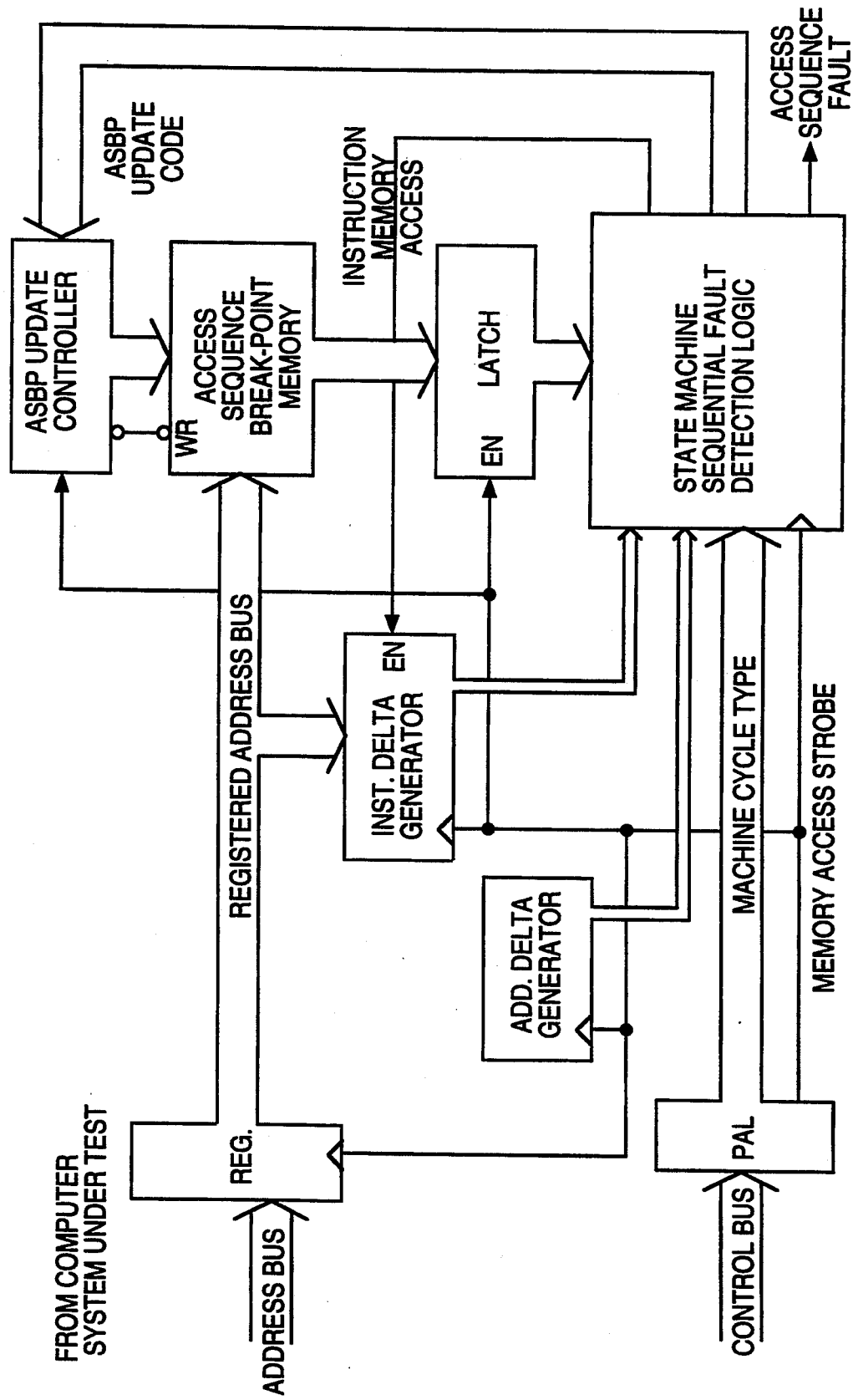
FIGS. 10, 11 and 12 show the extension of the Memory Address Delta concept: expanding the Delta range beyond the simple Plus-One output; and also tracking the Program Counter Delta.
Figure 11:
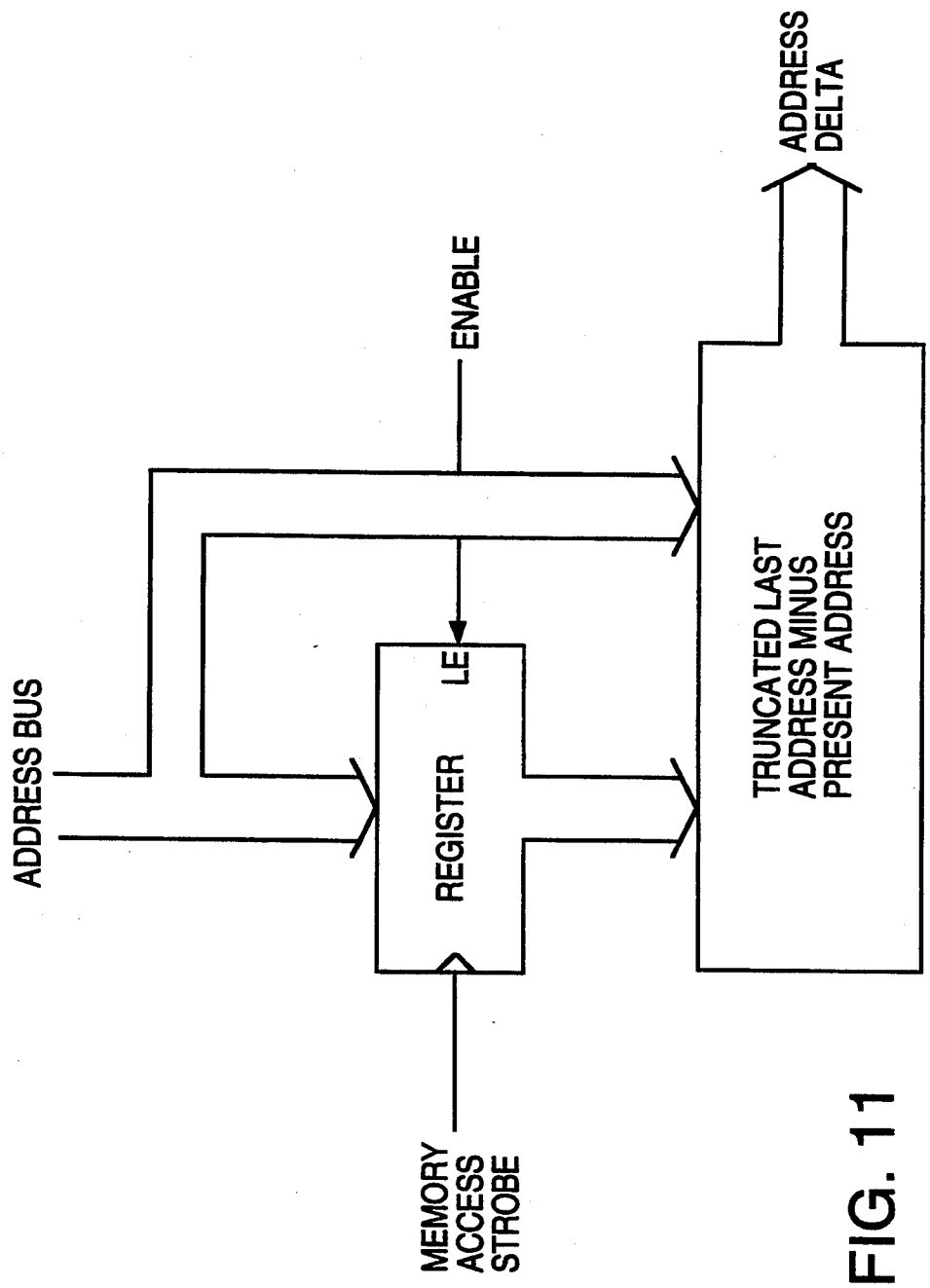
Figure 12:
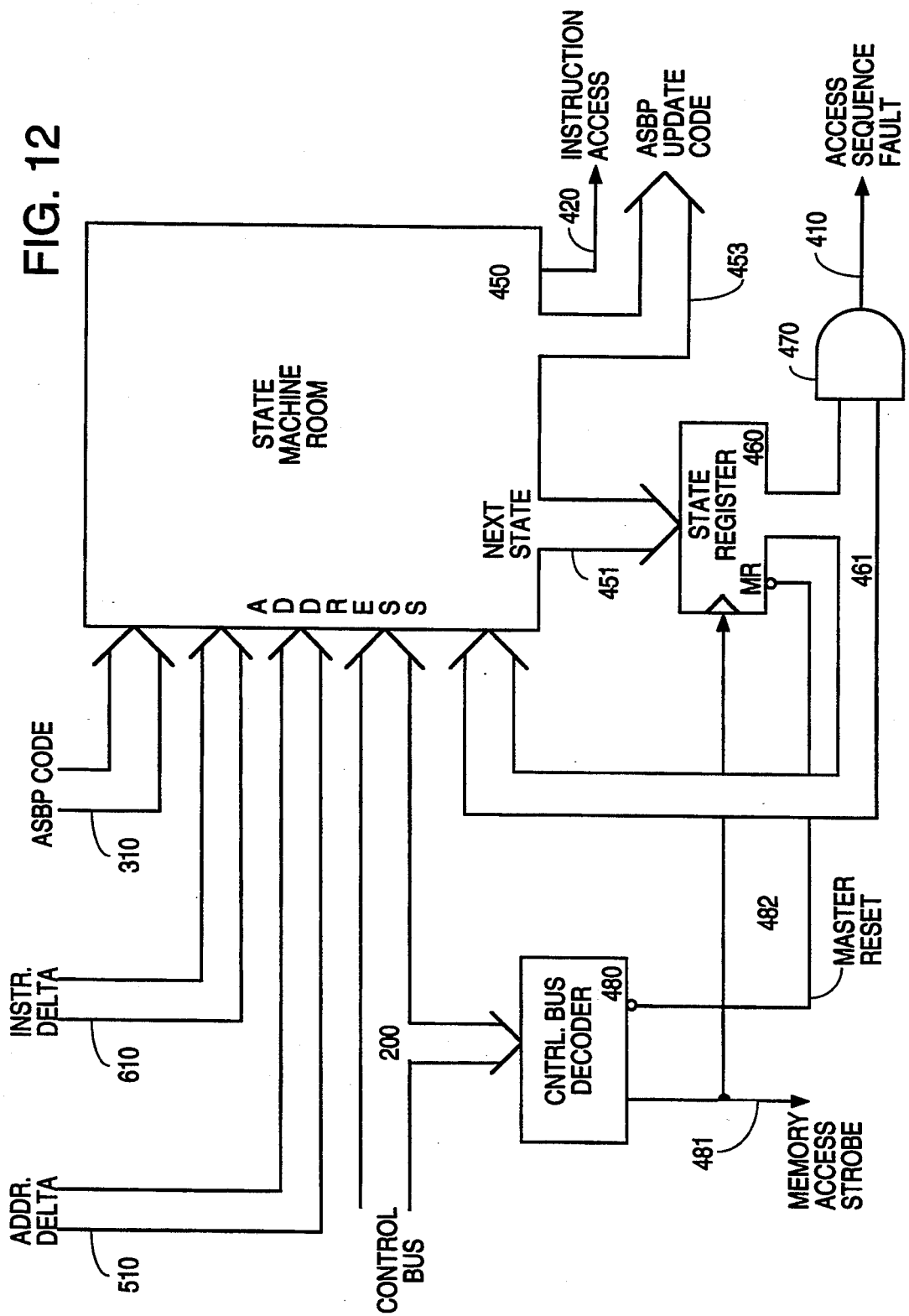
Figure 13:
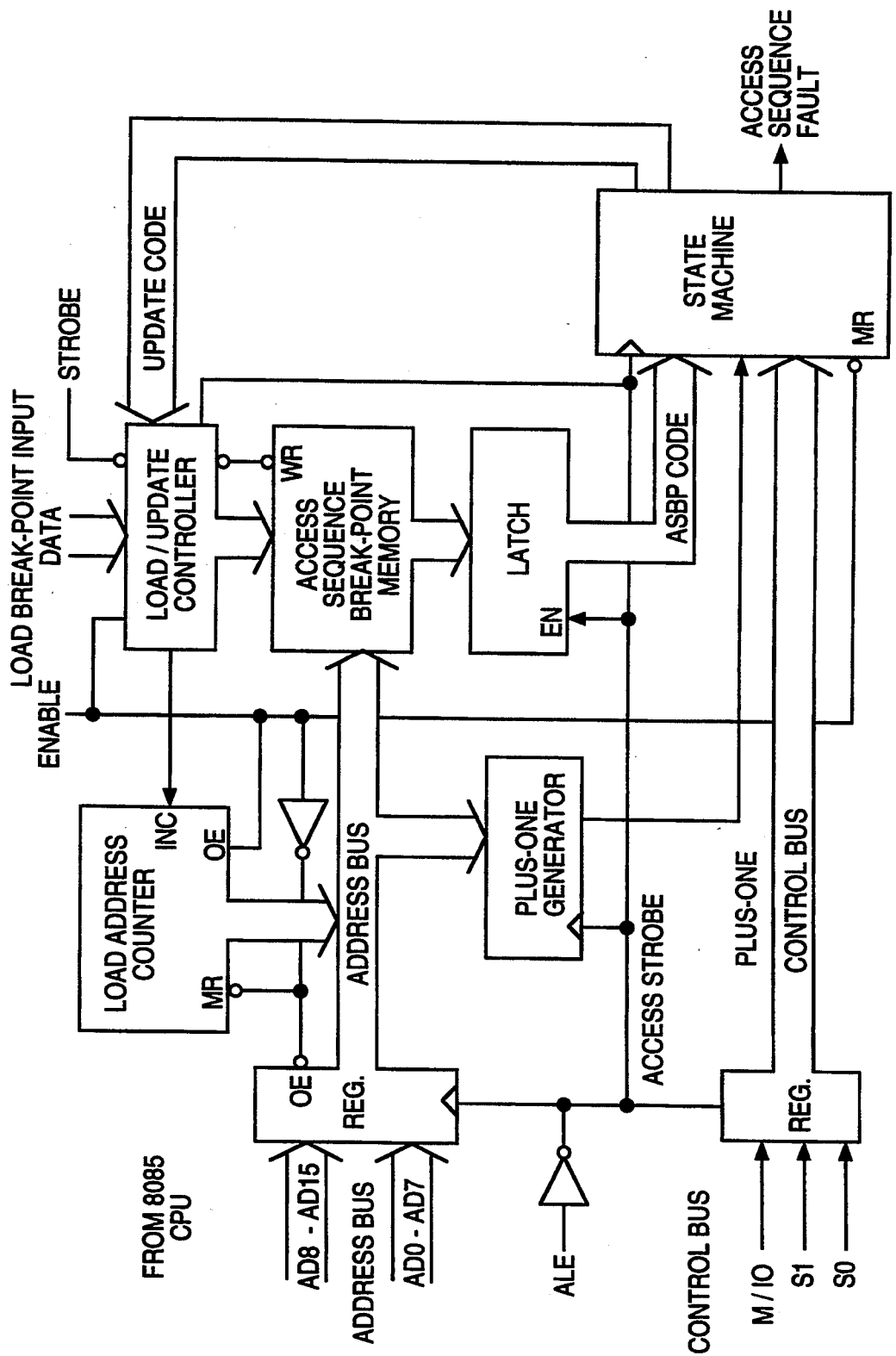
FIG. 13 shows the 8085 Semi-automatic Program Execution Error Detector with logic added to load the ACCESS SEQUENCE BREAK-POINT MEMORY.

The STATE MACHINE SEQUENTIAL FAULT DETECTION LOGIC 400 shown in FIG. 6 consists of a STATE MACHINE ROM 450, containing the State Machine's program; a STATE REGISTER 460, and an "AND" gate 470. The "all ones" state of the STATE REGISTER 460 is the Fault State which generates the ACCESS SEQUENCE FAULT 410 output.

On each low to high transition of the MEMORY ACCESS STROBE 211 input, the NEXT STATE 451 output from the STATE MACHINE ROM 450 is loaded into the STATE REGISTER 460.

The NEXT STATE 451, and ASBP UPDATE CODE 453 outputs from the STATE MACHINE ROM 450 are a function of the LATCHED ASBP CODE 51, the PLUS-ONE 871 signal, the Status signals from the CONTROL BUS 200 saved in register 220 (RMI/O 222, RS1 223, and RS0 224) and the output 461 from the STATE REGISTER 460.

The STATE REGISTER 460 is initialized to the ZERO State by the MASTER RESET 205 from the CONTROL BUS 200.

Each State defines the programmer's expectations in regards to the inputs to the State Machine.

If any input to the State Machine shown as the LATCHED ASBP CODE 51, the PLUS-ONE 871 signal, or a Status signal (RMI/O 222, RS1 223, or RS0 224) fails to conform to the expectations of the programmer, the FAULT State is selected as the NEXT STATE 451 output from the STATE MACHINE ROM 450.

After a conditional instruction's Op-Code is accessed by the CPU, the resulting memory access sequence, by Function type, will not in some cases be exactly predictable. With some types of CPUs a conditional Jump will result in the same memory access sequence, by Function Type, if the Jump is taken or not taken.

On the other hand, after the Op-code for a conditional Return is accessed, the Function type of the next memory location accessed is dependent on if it is taken, then the next memory access will be a Stack Function Type memory location.

When more than one memory access sequence, by Function Type, may result from a conditional instruction's execution, the sequences selected by the CPU can be determined by the State Machine from the resulting memory address sequence.

After a conditional Return instruction is accessed, if the next memory access is to the following memory location, it is almost certain that the CPU expects to access an Op-Code Function Type memory location. If the next location in the memory is not accessed next, it is certain that an access to a Stack Function Type memory location is expected by the CPU.

For many CPU types, the numerical difference between the present memory address and the last memory address will provide all the additional information required for a State Machine to determine the Function Type expectations of the CPU when an Op-code for a conditional instruction is executed. For many CPU types the only address delta information required is if the present memory address is one greater than the last memory address.

A slightly more definitive memory address delta information may be required for some CPU types. A two bit code for the address Delta may, as an example, indicate one of the four possibilities listed below:

1. Present address is less than last address;
2. Present address is equal to last address;
3. Present address is equal to last address plus one;
4. Present address is greater than last address plus one.

An even greater degree of memory access sequence monitoring can be achieved, when required, by generating an instruction access address delta. During the execution of a program, the majority of instuctions (Op-codes, and Operands), are accessed by the CPU from sequential memory locations. Except for a return from an interrupt, most Instruction Op-codes are only expected to be accessed from a location in memory that is one greater than the address used to access the previous Op-Code or Operand (in-line code).

A Memory Address Delta generator is converted to an Instruction Access Delta generator by only enabling the register to load the present address plus one when a memory access is for an Op-Code or Operand.

The Op-Code of an in-line instruction is assigned an ASBP code indicating the Op-Code is only expected to be accessed when the Instruction Access Delta generator Plus-One output is True, or after the execution of a Return from interrupt instruction.

Adding an Instruction Access Delta generator to the design of an Automatic Program Execution Monitor significantly increases its ability to detect a fault in the instruction execution sequence.

The Semi-automatic Program Execution Error Detection structure of this invention generates an early indication of certain types of faults in the execution of a computer program or in the operation of a computer based dedicated controller.

A fault indication is generated when the sequence in which memory locations are accessed during a program's execution does not conform to the sequence expected by the programmer. An out of sequence access to a memory location during the execution of a program is a certain and early indication of a fault in the program, or in the design or construction of the hardware used to execute the program. An indication of a fault is generated significantly before an incorrect output is generated by the program due to the fault.

The fault indication so generated may be used to assist in the debugging of a computer program or computer based digital controller, or for monitoring the operation of a computer based digital controller used in a critical application.

With prior art techniques, the search for the location of a fault when debugging a computer program starts from the point in the program's execution when the output sequence generated by the program does not conform to the programmer's expectations.

Significantly less time is required to determine the location of a fault in the coding of a program or in the design or construction of the hardware used to execute the program, if the search for the fault's location is started from the point in the program's execution when a memory location access departs from the memory access sequence expected by the programmer.

Semi-automatic Program Execution Error Detection in accordance with this invention tests every CPU memory access for a departure from the memory accesses sequence expected by the programmer, and when the CPU accesses memory for an instruction, the programmer expects the CPU will only access a memory location assigned an instruction by the program.

Automatic Program Execution Monitoring will immediately generate a fault signal if the program loses control of the Program Counter, or if any memory access departs from the memory access sequence expected by the programmer.

With the greater degree of program execution monitoring provided by this invention and the immediate generation of a fault signal, the possibility that the controller will generate a faulty output before corrective action is taken is significantly reduced.

To implement the Automatic Program Execution Monitoring Process, prior to the program's execution, information abstracted from the program to be executed is converted into a definition of when the programmer expects each memory location to be accessed during the program's execution. This definition assigns an Access Sequence Break-Point (ASBP) code to each location in the computer's memory space.

Then on every access by the CPU to a memory location during the program's execution, the memory location's ASBP code is examined to determine if the memory location is expected to be accessed at this point in the memory access sequence. If the memory location is not expected to be accessed at this time, an Access Sequence Fault indication or signal is generated.

This process may be implemented by a software procedure when the program is executed by a Simulator/Debugger, or by hardware when the program is executed in real time by a computer.

In a software implementation of this process, the Access Sequence Break-Point codes are used to initialize an array. In a hardware implementation, the Access Sequence Break-Point codes are loaded into a dedicated memory.

During the program's execution, on every memory access performed by the simulated or hardware CPU, two inputs are provided to the Automatic Program Execution Monitoring process:

1. Current Memory Address, "cur_mem_add"
2. A Memory Access Type code which specifies the type of memory access provided by the CPU's control bus in a hardware implementation.

The following storage elements are used during the processing:

1. Access Sequence Break-Point Array, "asbp_array[]"
2. Current Access Sequence Break-Point, "asbp"
3. Last Memory Address, "last_mem_add"
4. Memory Address Delta, "delta
5. Current State, "c_state
6. Next State Array, "n_state[]"
7. ASBP Code Update Array, "update[]"

The CPU's instruction set defines the contents of the Next State, and ASBP Code Update Arrays, In a hardware implementation these two arrays are provided by a ROM.

THE AUTOMATIC PROGRAM EXECUTION MONITORING PROCESS:

1. asbp=asbp_array[cur_mem _add];
2. if (cur_mem_add= =(last mem_add_ +1)) delta=1; else delta=0;
3. update=update[asbp, delta, type, c_state];
4. if (update !=0) asbp_array[cur_mem_add]=update;
5. c_state=n_state[asbp, delta, type, c_state]
6. if (c_state= =ERROR) return TRUE; else return FALSE;

The Programmer's Memory Access Sequence Expectations:

Inherent in the definition of a computer program is an assignment of the type of function the programmer expects every location in computer's memory to perform during the program's execution. The function a memory location is expected to perform defines when during the program's execution the programmer expects the memory location will be accessed.

Major Function Types:

With few exceptions (self modifying code as one example of an exception) every location in the computer's memory space can be classified into one of the three major Function Types; 1. Instructions, 2. Data, and since few programs use every memory location, 3. Not Used.

This most basic classification of memory locations, in terms of the function each memory location is expected to perform during the program's execution, is clearly defined by a definition of the program, and provides a basic definition of when during the program's execution the programmer expects each memory location to be accessed.

Every CPU memory access is for either an instruction or data. The programmer expects the CPU will not access a Not Used or Data memory locations for an Instruction. With a few exceptions, such as a memory test, the programmer does not expect Instruction and Not Used memory locations to be accessed by the CPU as Data.

A memory access departing from these most basic expectations of the programmer is a certain and early indication of a program or hardware fault, and these most basic programmer expectations are easy to determine from a definition of the program.

A more detailed definition of the type of function each location in the computer's memory space is expected to perform is provided by a definition of the program and the CPU's instruction set. A more detailed definition of the function each memory location is expected to perform provides a more exact definition of when, during the program's execution, the programmer expects a memory location to be accessed.

The following examples illustrate the more detailed definition of each memory location's Function Type, provided by a definition of the program and the CPU's instruction set and the more exacting definition of when a memory location is expected to be accessed provided by a more detailed Function Type definition.

The memory locations expected to perform the function of providing instructions for the CPU to execute, can be further divided into memory locations expected to provide an Operation Code (Op-Code), and memory locations expected to provide the Operand or Operands required by some Op-Codes.

It is a certain and early indication of a fault in the program or hardware if an Operand Function Type memory location is accessed by the CPU for an Op-Code, or if an Op-Code Function Type memory location is accessed by the CPU for an Operand.

Many simple CPUs provide a signal or status code indicating when the CPU is accessing memory for an Instruction Op-Code. If an access for an Op-code is indicated by the CPU, and a memory location is accessed that was not assigned an Op-Code by the program, it is a certain and early indication of a program or hardware fault.

Some simple CPUs access any Operands required by an Op-Code, immediately after the Op-Code access, from the following memory location or locations. When this type of CPU accesses memory for an Operand, the present memory address is always one greater than the last memory address. After this type of CPU accesses an Op-Code requiring one or more Operands, it is a certain and early indication of a hardware fault if the next memory access is not to the next location in memory.

A programmer expects a Data Function Type memory location to be accessed during the program's execution according to the assignment of instructions to memory locations and a definition of the memory access sequence (by Function Type) by the execution of each instruction in the computer's instruction set.

The definition of each CPU instruction specifies:

1. The number of accesses to Operand Function Type memory locations (if any), and
2. The number of accesses (if any), to, and the type of, a Data Function Type memory location expected to follow an access to an Op-Code Function Type memory location.

Tracking the execution of a conditional instruction is a special case. Alternate Function Type memory access sequences are defined for conditional instructions. After a conditional instruction's Op-Code is accessed by the CPU, the resulting memory access sequence, by Function Type, will not in some cases be exactly predictable. With some types of CPUs a conditional Jump will result in the same memory access sequence, by Function Type, if the Jump is taken or not taken.

On the other hand, after the Op-Code for a conditional Return is accessed, the Function Type of the next memory location accessed is dependent on if the Return is taken or not taken. An Op-Code Function Type memory location will be accessed next if the Return is not taken, and if it is taken, the next memory access will be to a Stack Function Type memory location.

Memory Access Sequence Delta Information.

When more than one memory access sequence (by Function Type) may result from a conditional instruction's execution, the sequences selected by the CPU can be determined by the State Machine from the resulting memory address sequence.

After a conditional Return instruction is accessed, if the next memory access is to the following memory location, it is almost certain that the CPU expects to access an Op-Code Function Type memory location. And if the next location in the memory is not accessed next, it is certain that an access to a Stack Function Type memory location is expected by the CPU.

For many CPU types, the numerical difference (i.e., the address "delta") between the present memory address and the last memory address will provide all the additional information required for a State Machine to determine the Function Type expectations of the CPU when an Op-Code for a conditional instruction is executed. And for many CPU types the only address delta information required is whether the present memory address is one greater than the last memory address.

Data Function Type Memory Locations.

The programmer expects that a Data Function Type memory location will only be accessed after a Data Access instruction is accessed by the CPU as an instruction. The type of instruction accessed also defines the type of Data expected to be accessed.

Data Function Type memory locations are expected by the program, to perform a specified function. For some Data Function type memory locations, an Initial Data Function type is assigned by the program. The Data Function type may then change during the program's execution, as a result of the program's execution.

Read Only Data Function Type Memory Locations.

Some data values assigned to memory locations by the program are not expected to be changed during the program's execution, or in the case of a ROM, can not be changed. These memory locations are expected to be accessed only after an access to a Data Read instruction, and only for a memory read. It is a certain and early indication of a fault if one of these memory locations is accessed after any other instruction or for a memory write. This Function Type may also be used to indicate a memory-mapped input-only location.

Initialized Read/Write Data Function Type Memory Location.

Some data values assigned to memory locations by the program are initial data values. The locations are expected to be accessed after a Data Read, or a Data Write instruction. A memory-mapped input/output location may be assigned this Data Function Type.

Not Initialized Read/Write Data Function Type Memory Locations.

Memory locations defined by the program to be used as Data, and not assigned values by the program, are initially assigned a Not Initialized Read/Write Data Function Type. Memory locations initially assigned this Data Function Type are expected to be accessed only after a Data Write instruction is accessed, and for a memory write operation. It is a certain and early indication of a fault if one of these Function Type memory locations is accessed by a Data Read instruction. When one of these memory locations is accessed by a Data Write instruction, its Function Type is changed to Initialized Data.

Stack Function Type Memory Locations.

The program's definition specifies a section of the memory space the programmer expects to be used for Stack operations. Stack access instructions (Push, Pop, Call, or Return) are expected to access only this section of the computer's memory space. It is a certain early indication of a program or hardware fault if any other Function Type memory location is accessed by a Stack access instruction. Unless otherwise defined, Stack memory locations are expected by the programmer to only be accessed by Stack Access instructions. The type of function a Stack memory location is expected by the programmer to perform changes during the program's execution.

Not Current Stack Function Type.

Before a value is written to a stack memory location during the program's execution, this memory location can not perform the function of providing any type of data. Stack memory locations are initially assigned a Not Current Stack Function Type. If a Not Current Stack memory location is read by any type of instruction, it is a certain and early indication of a program or hardware fault. When a value is written to a Not Current Stack memory location the Function Type of the memory location is changed to indicate the type of value written.

PC Value Stack Function Type.

When a value is written to a Not Current Stack memory location by a Call instruction, the Function Type of the memory location is changed to PC Value Stack. The programmer expects a Return instruction will only access a PC Value Stack memory location. It is a certain and early indication of a program or hardware fault if a Return instruction accesses any other Function Type memory location. When a PC Value Stack memory location is accessed by a Return instruction, the memory location's Function Type is changed to Not Current Stack.

Data Value Stack Function Type.

If not otherwise defined, when a Push instruction writes a value to a Not Current Stack location, the memory location's Function Type is changed to Data Value Stack, and the programmer expects a Data Value Stack memory location will only be accessed by a Pop instruction. And when accessed by a Pop instruction, the memory location's Function Type is changed to Not Current.

Departures from Common Stack Access Expectations.

The program may define departures from the above described most common programmer expectations regarding when a Stack memory location will be accessed during the program's execution. In some cases, the programmer expects a Stack memory location to be accessed by a non-stack access instruction, or a Stack access instruction to access a Stack memory location in a way departing from the most common expectations presented above. As an example, often the programmer expects a Pop instruction to access a PC Value Stack Function Type memory location, and a Push instruction may be expected to write a PC Value to a Stack memory location.

Memory Location Function Type Summary.

The type of function the programmer expects each location in the computer's memory space to perform during a program's execution may be classified in many different ways to provide a definition of when each memory location is expected to be accessed. Only a few of the many ways memory locations may be classified in terms of the type of function a memory location is expected to perform are described by the above examples. The examples presented either are not intended to represent a recommended set of Function Types to use in a specific application or an exhaustive list of Function Type classifications.

What are the programmer's expectations? Consider the two short segments of an 8085 assembled program listing shown in Table D.

TABLE D

| 043E | CD2A57   | 0285 |          | CALL  | DISPLAY |
| 0441 | 48454C4C | 0286 |          | DM    | "HELLO" |
| 0445 | CF       |      |          |       |         |
| 0446 | 212B01   | 0287 |          | LXI   | H,MODE  |
| 572A | E3       | 1432 | DISPLAY: | XTHL  |         |
| 572B | F5       | 1433 |          | PUSH  | PSW     |
| 572C | 7E       | 1434 | DISPLUP: | MOV   | A,M     |
| 572D | FECF     | 1435 |          | CPI   | "$"     |
| 572F | 23       | 1436 |          | INX   | H       |
| 5730 | CA4957   | 1437 |          | JZ    | DISPXIT |
| 5733 | CD3A58   | 1438 |          | CALL  | CONOUT  |
| 5736 | C32C57   | 1439 |          | JMP   | DISPLUP |
| 5739 | F1       | 1440 | DISPXIT: | POP   | PSW     |
| 573A | E3       | 1441 |          | XTHL  |         |
| 573B | C9       | 1442 |          | RET   |         |

As a few examples, it is obvious from this listing that:

1. Except for 0441 and 0445, the memory locations shown in the first column of the listing have all been assigned Op-Codes by the program, and are (except for a memory check) only expected by the programmer to be accessed when the CPU's Status indicates the CPU accessing memory for an Op-Code.

2. Memory locations 0441 to 0445 are expected to be accessed only when the CPU's Status indicates a Data Memory Read, and since these locations are only accessed as bytes, they are expected to be accessed only when the present memory address is not one greater than the last.

3. All other memory locations defined by the listing are only expected to be accessed for an Operand. An 8085 accesses an Operand memory location only when the CPU's Status indicates a Data Memory Read and the present memory address is one greater than the last.

4. After the Operands at locations 0440 and 5735 are accessed, the programmer expects two memory write accesses to memory locations assigned to be used for Stack operations, and the Stack memory locations accessed are assigned the function of saving a Program Counter value.

5. After the CPU accesses the "RET" Op-Code at location 573B, the programmer expects the next two memory accesses will be Reads to Stack memory locations assigned the function of saving a Program Counter value.

6. After the CPU accesses the "PUSH" Op-Code at location 572B, the programmer expects two memory write accesses to Stack memory locations to follow, and the memory locations accessed are assigned the function of saving Data.

7. After the CPU accesses the "POP" Op-Code at location 5739, the programmer expects two memory read accesses to Stack memory locations assigned the function of saving Data.

Although these are the programmer's expectations, the execution of the program may fail to meet these obvious expectations due to a program logic or hardware fault. After an unexpected memory access occurs, the CPU may perform literally millions of memory accesses before the program coding or hardware that caused the unexpected memory access results in the generation of an incorrect output that can be detected by the user.

STATE MACHINE PROGRAM.

The first task is to design an "Access Sequence Break-Point" code set. Each ASBP code defines one or more possibilities for when the programmer expects a memory location to be accessed during a program's execution. The number of bits used for each ASBP code, determines the number of ASBP codes, the amount of programmer's memory access sequence expectations that can be encoded in the ASBP code set, and the amount of hardware required to implement a Sem-iautomatic Program Execution Error Detector apparatus.

Each instruction in the CPU's instruction set is classified in terms of the memory access sequence that results when the instruction is executed. Since many instructions result in an access to non-program code memory locations the classifying of instructions also includes the classifying of non-program code memory locations.

For this example a set of 16 (four bit) Access Sequence Break-Point codes have been selected. The objective of this ASBP code set is to provide a high degree of program coding error detection capability with a minimum amount of hardware.

Non-Program Access Sequence Break-Point Codes.

The seven ASBP codes shown in Table A define the Programmer's expectations regarding non-program code memory locations.

TABLE E

| 0000 | "NUL" | Not Used Memory Location |
| 0001 | "DRO" | Data Read Only |
| 0010 | "DIN" | R/W Data (INitialized) |

TABLE E-continued

| 0011 | "DNI" | R/W Data (Not Initialized) * |
| 0100 | "SNC" | Stack Not Current * |
| 0101 | "STD" | STack Data value * |
| 0110 | "STP" | STack Program Counter value * |

(*) Are Updated when accessed.

Access Sequence Break-Point Update Code.

A three bit ASBP UPDATE CODE (shown in Table F) generated by the State Machine selects when and how an ASBP code is updated during the Program's execution.

TABLE F

| UD2 | UD1 | UD0 | |
| --- | --- | --- | --- |
| 1 | 1 | 1 | No Update |
| 0 | 1 | 0 | Update To "DIN" Data INitialized |
| 1 | 0 | 1 | Update To "STD" Stack Data Value |
| 1 | 1 | 0 | Update To "STP" Stack PC Value |
| 1 | 0 | 0 | Update to "SNC" Stack Not Current |

Program Access Sequence Break-Point Codes.

In this Access Sequence Break-Point code set, Op-Code ASBP codes do not indicate if an access for an Operand is expected to follow an access for an Op-Code. This reduces the number of ASBP codes and the size of both the Access Sequence Break-Point Memory and the State Machine ROM. This allows the same Op-Code ASBP code to be used for instructions that require one, two or no Operands.

Operand Access Sequence Break-Point Code.

All Instruction Operands are assigned the same ASBP code.

0111  "OPR"  Instruction Operand.

The "Plus One" signal and CPU Status are used by the State Machine to determine if an Operand ASBP code is expected after an access to an Op-Code or Operand ASBP code. If the "Plus One" signal is True and the CPU Status indicates a Memory Read, an Operand ASBP code is expected. If an Operand is accessed, the State Machine (the next Op-Code follows),
  2. One Operand,
  3. One Operand, then an Input machine cycle,
  4. One Operand, then an Output machine cycle, or
  5. Two Operands.

1001 DAE Read/Write Data Access Expected.

This Op-Code ASBP indicates at least one access (but not more than two accesses) to a Data type memory location ("DRO", "DNI", or "DIN") is expected before the next Op-Code is accessed.

After a memory location assigned this ASBP code is accessed, the State Machine's program expects one of the sequences listed below before the next Op-Code is accessed.
  1. One Data Read,
  2. One Data Write,
  3. One Data Read, then a Data Write
  4. One Operand, then a Data Write,
  5. Two Operands, then a Data Read,
  6. Two Operands, then a Data Write,
  7. Two Operands, then two Data Writes,
  8. Two Operands, then two Data Reads.

The State Machine's program expects that a memory location assigned a Data Read Only ("DRO") ASBP code will be accessed only when a "MRD" Status is indicated by the CPU.

An access to a Read/Write Not Initialized Data Memory location ("DNI") is expected only when the CPU's status indicates a Memory Write ("MWR"), and the ASBP code is updated to Initialized ("DIN").

The "Plus One" signal is used by the State Machine's program to determine when a Data memory access is expected. If after the Op-Code access, the "Plus One" is True, an access to an Operand ("OPR") memory location is expected. When the "Plus One" signal goes False, an access to a Data memory location is expected.

1010 TSD Two Stack Data Accesses Expected.

This ASBP code is assigned to all "PUSH" and "POP" Op-Codes.

After a memory location assigned this ASBP code is accessed, the State Machine's program expects one of the sequences listed below before the next Op-Code is accessed.

1. Two Read accesses to Stack Data Value memory locations, and the ASBP codes are updated to Stack Not Current, or
2. Two Write accesses to Stack Not Current memory locations, and the ASBP codes are updated to Stack Data Value.

1011 TSP Two Stack PC Accesses Expected.

This ASBP code is assigned to "CALL", "RST", and "RET" Op-Codes, as well as "PUSH" and "POP" Op-Codes, designated by the programmer.

After a memory location assigned this ASBP code is accessed, the State Machine's program expects one of the sequences listed below before the next Op-Code is accessed.

1. Two Read accesses to Stack PC Value memory locations, and the ASBP codes assigned to the memory locations are updated to Stack Not Current,
2. Two Write accesses to Stack Not Current memory locations, and the ASBP codes assigned to the memory locations are updated to Stack PC Value, or
3. Two Operand accesses, then two Write accesses to Stack Not Current memory locations, and the memory locations ASBP codes are updated to Stack PC Value.

1100 TCP Two Stack PC Values May be Accessed Op-Code.

This ASBP code is assigned to the Op-Code for conditional "CALL" and "RET" instructions.

After a memory location assigned this ASBP code is accessed, the State Machine's program expects one of the sequences listed below before the next Op-Code is accessed.

1. None (next Op-Code is accessed, conditional Return not taken),
2. Two Read accesses to Stack PC Value memory locations, and the ASBP codes are updated to Stack Not Current (Conditional Return is taken),
3. One Operand access (conditional Call not taken), or
4. Two Operand accesses, then two Write accesses to Stack Not Current memory locations, and the ASBP codes are updated to Stack PC Value (conditional Call taken).

1101 FCS Four Current Stack (STD or STP) Accesses Expected.

This ASBP code is assigned only to XTHL Op-Code.

After a memory location assigned this ASBP code is accessed, the State Machine's program expects two Stack Reads followed by two Stack Writes, and the ASBP codes assigned to the memory locations are not updated.

1110 DSD Designated Stack Data Value Accesses Expected.

This ASBP code is assigned to the Op-Code for a register indirect memory access instruction designated by the programmer as expected to access a Stack Data Value memory location.

After an access to a memory location assigned this ASBP code, the State Machine's program expects one of the sequences listed below before the next Op-Code is accessed.

1. A Write access to a Stack Data Value memory location, or
2. A Read access to a Stack Data Value memory location, or
3. A Read access to a Stack Data Value memory location, then a Write access to the same location.

ASBP code is not Updated.

1111 AFT One Any Function Type Read Access Expected.

This ASBP code is assigned to the Op-Code for register indirect Data access Op-Codes designated by the programmer as expected to access as Data, Any Function Type location.

After a memory location assigned this ASBP code is accessed, the State Machine's program expects a Read access to any location in the memory, or a Write access to any memory location except Read Only Data, Operands, or Op-Code memory locations.

STATE MACHINE PROGRAM LISTING:

The following Program for the State Machine defines for each State: (1) The Next State; and (2) ASBP code Up-Date, as a function of the ASBP code the CPU's Status, and the "Plus One" signal.

In the State Machine's Program, "AnyOC" Indicates any Op-Code type ASBP, and "AnyFT" Indicates any ASBP code.

RESET STATE: #00hex

This State is selected by the CPU's Reset signal.

On the first "ALE" High to Low transition after Reset goes False, State "OCOI" is selected. One clock is required after reset to load CPU's Address and Status into Input Holding registers.

OCOI Op-Code or Interrupt Expected but Not Halt State: #01hex

This state is entered from the RESET State, or when (as defined by the 8085 up's instruction set) all the memory accesses and/or machine cycles expected to be performed by the execution of the last instruction have been completed. Then only an access to an Op-Code memory location is expected.

Since this state is not entered after an access to an Op-Code memory location a "HALT" CPU Status is not expected.

| ASBP Code | CPU's Status | "Plus One" | Next State | Up-Date | |
|---|---|---|---|---|---|
| AnyOC | INT | X | → INT0 | None | (Interrupt) |
| NDA | OCF | X | → NDA0 | None | (No Mem. Data Access) |
| DAE | OCF | X | → DAE0 | None | (Mem. Data Access) |
| TSD | OCF | X | → TSD0 | None | (Two Stk. Data) |
| TSP | OCF | X | → TSP0 | None | (Two Stk. PC) |
| TCP | OCF | X | → TCP0 | None | (Two Stk. PC maybe) |
| FCS | OCF | X | → FCS0 | None | (4 Cur. Stk. Accesses) |
| DSD | OCF | X | → DSD0 | None | (Des. Data Stk. Access) |
| AFT | OCF | X | → AFT0 | None | (One Any FT Access) |
| Else GO TO "FAULT" State | | | | | |

NDA0 State After NO Data Memory Access "IND" Op-Code: #02hex

Only an access to an Op-Code or Operand memory location with the "Plus One" input True is expected.

This is the only State expecting a possible "HALT" CPU Status.

| ASBP Code | CPU's Status | "Plus One" | Next State | Up-Date | |
|---|---|---|---|---|---|
| AnyOC | HLT | TRUE | → WFI | None | (HALT) |
| AnyOC | INT | TRUE | → INT0 | None | (Interrupt) |
| OPR | MRD | TRUE | → NDA1 | None | (First Operand) |
| NDA | OCF | TRUE | → NDA0 | None | (No Mem. Data Access) |
| DAE | OCF | TRUE | → DAE0 | None | (Mem. Data Access) |
| TSD | OCF | TRUE | → TSD0 | None | (Two Stk. Data) |
| TSP | OCF | TRUE | → TSP0 | None | (Two Stk. PC) |
| TCP | OCF | TRUE | → TCP0 | None | (Two Stk. PC maybe) |
| FCS | OCF | TRUE | → FCS0 | None | (4 Cur. Stk. Accesses) |
| DSD | OCF | TRUE | → DSD0 | None | (Des. Data Stk. Access) |
| AFT | OCF | TRUE | → AFT0 | None | (One Any FT Access) |
| Else GO TO "FAULT" State | | | | | |

NDA1 State After "NDA" Op-Code and One Operand Access: #03hex

An Input/Output Machine cycle, a Second (last) Operand, or an Op-Code is expected completing an "NDA" instruction's execution.

| ASBP Code | CPU's Status | "Plus One" | Next State | Up-Date | |
|---|---|---|---|---|---|
| AnyFT | IOR | X | → OCOI | None | (Input) |
| AnyFT | IOW | X | → OCOI | None | (Output) |
| OPR | MRD | TRUE | → OCOI | None | (Second Operand) |
| AnyOC | INT | X | → INT0 | None | (Interrupt) |
| NDA | OCF | X | → NDA0 | None | (No Mem. Data Access) |
| DAE | OCF | X | → DAE0 | None | (Mem. Data Access) |
| TSD | OCF | X | → TSD0 | None | (Two Stk. Data) |
| TSP | OCF | X | → TSP0 | None | (Two Stk. PC) |
| TCP | OCF | X | → TCP0 | None | (Two Stk. PC maybe) |
| FCS | OCF | X | → FCS0 | None | (4 Cur. Stk. Accesses) |
| DSD | OCF | X | → DSD0 | None | (Des. Data Stk. Access) |
| AFT | OCF | X | → AFT0 | None | (One Any FT Access) |
| Else GO TO "FAULT" State | | | | | |

In this state, "Plus One" can not be predicted, when an Op-Code is accessed, since it will be False if a conditional Jump is not taken, and True when a single Operand instruction is executed.

DAE0 First State After Data Memory Access "DAE" Op-Code: #04hex

If "Plus One" is True, an Operand is expected.
If "Plus One" is False, a Data Read or Write access is expected.

If a Data Write, occurs the execution of the instruction is completed and an Op-Code is expected next.

If a Data Read occurs, the next memory access may be:

1. For Op-Code access, or
2. A Write to the same memory location, if the instruction was a "INC M" or "DEC M".

| ASBP Code | CPU's Status | "Plus One" | Next State | Up-Date | |
|---|---|---|---|---|---|
| DRO | MRD | FALSE | → DAE5 | None | (No Operand Inst.) |
| DIN | MRD | FALSE | → DAE5 | None | (No Operand Inst.) |
| DIN | MWR | FALSE | → OCOI | None | (Inst. Seq. Completed) |
| DIN | MWR | FALSE | → OCOI | DIN | (Inst. Seq. Completed) |
| OPR | MRD | TRUE | → DAE1 | None | (First Operand) |

-continued

| ASBP Code | CPU's Status | "Plus One" | Next State | Up-Date |
|---|---|---|---|---|
| Else GO TO "FAULT" State | | | | |

DAE1 State After "DAE" and One Operand Access: #05hex

If "Plus One" is False, a Write Data Access is expected, since a "MVI M,#DATA" is the only one Operand Data access instruction.

If "Plus One" is True, an Operand is expected.

| ASBP Code | CPU's Status | "Plus One" | Next State | Up-Date | |
|---|---|---|---|---|---|
| DNI | MWR | FALSE | → OCOI | DIN | ( Inst. Seq. Completed ) |
| DIN | MWR | FALSE | → OCOI | None | ( Inst. Seq. Completed ) |
| OPR | MRD | TRUE | → DAE2 | None | ( Second Operand ) |
| Else GO TO "FAULT" State | | | | | |

DAE2 State After "DAE" and Second Operand Access: #06hex

After two Operand accesses, a Data Access is expected.

If a Data Read access occurs, the next access must be a Data Read or an Op-Code.

If a Data Write access occurs, the next access must be a Data Write or an Op-Code.

| ASBP Code | CPU's Status | "Plus One" | Next State | Up-Date | |
|---|---|---|---|---|---|
| DRO | MRD | FALSE | → DAE3 | None | ( Go test for second Data |
| DIN | MRD | FALSE | → DAE3 | None | Read or Op-Code ) |
| DIN | MWR | FALSE | → DAE4 | None | ( Go test for second data |
| DNI | MWR | FALSE | → DAE4 | DIN | Write or Op-Code ) |
| Else GO TO "FAULT" State | | | | | |

DAE3 State After "DAE" Two Operands, & One Data Read: #07hex

If "Plus One" is True, a Second Data Read is expected.

If "Plus One" is False, an Op-Code is expected.

| ASBP Code | CPU's Status | "Plus One" | Next State | Up-Date | |
|---|---|---|---|---|---|
| DRO | MRD | TRUE | → OCOI | None | ( Inst. Seq. Completed ) |
| DIN | MRD | TRUE | → OCOI | None | ( Inst. Seq. Completed ) |
| AnyOC | INT | FALSE | → INT0 | None | ( Interrupt ) |
| NDA | OCF | FALSE | → NDA0 | None | ( No. Mem. Data Access ) |
| DAE | OCF | FALSE | → DAE0 | None | ( Mem. Data Access ) |
| TSD | OCF | FALSE | → TSD0 | None | ( Two Stk. Data ) |
| TSP | OCF | FALSE | → TSP0 | None | ( Two Stk. PC ) |
| TCP | OCF | FALSE | → TCP0 | None | ( Two Stk. PC maybe ) |
| FCS | OCF | FALSE | → FCS0 | None | ( 4 Cur. Stk. Accesses ) |
| DSD | OCF | FALSE | → DSD0 | None | ( Des. Data Stk. Access ) |
| AFT | OCF | FALSE | → AFT0 | None | ( One Any FT Access ) |
| Else GO TO "FAULT" State | | | | | |

DAE4 State After "DAE", Two Operands, and One Data Write: #08hex

If "Plus One" is True, a Second Data Write is expected.

If "Plus One" is False, an Op-Code is expected.

| ASBP Code | CPU's Status | "Plus One" | Next State | Up-Date | |
|---|---|---|---|---|---|
| DIN | MWR | TRUE | → OCOI | None | ( Inst. Seq. Completed ) |
| DNI | MWR | TRUE | → OCOI | DIN | ( Inst. Seq. Completed ) |
| AnyOC | INT | FALSE | → INT0 | None | ( Interrupt ) |
| NDA | OCF | FALSE | → NDA0 | None | ( No Mem. Data Access ) |
| DAE | OCF | FALSE | → DAE0 | None | ( Mem. Data Access ) |
| TSD | OCF | FALSE | → TSD0 | None | ( Two Stk. Data ) |
| TSP | OCF | FALSE | → TSP0 | None | ( Two Stk. PC ) |
| TCP | OCF | FALSE | → TCP0 | None | ( Two Stk. PC maybe ) |
| FCS | OCF | FALSE | → FCS0 | None | ( 4 Cur. Stk. Accesses ) |
| DSD | OCF | FALSE | → DSD0 | None | ( Des. Data Stk. Access ) |
| AFT | OCF | FALSE | → AFT0 | None | ( One Any FT Access ) |
| Else GO TO "FAULT" State | | | | | |

DAE5 State After "DAE" Op-Code, and One Data Read: #09hex

If not an Op-Code, then a Data Write to the same memory location just Read by an "INC M" or "DEC M" instruction is expected.

| ASBP Code | CPU's Status | "Plus One" | Next State | Up-Date | |
|---|---|---|---|---|---|
| DIN | MWR | FALSE | → OCOI | None | (Inst. Seq. Completed) |
| AnyOC | INT | FALSE | → INT0 | None | (Interrupt) |
| NDA | OCF | FALSE | → NDA0 | None | (No Mem. Data Access) |
| DAE | OCF | FALSE | → DAE0 | None | (Mem. Data Access) |
| TSD | OCF | FALSE | → TSD0 | None | (Two Stk. Data) |
| TSP | OCF | FALSE | → TSP0 | None | (Two Stk. PC) |
| TCP | OCF | FALSE | → TCP0 | None | (Two Stk. PC maybe) |
| FCS | OCF | FALSE | → FCS0 | None | (4 Cur. Stk. Accesses) |
| DSD | OCF | FALSE | → DSD0 | None | (Des. Data Stk. Access) |
| AFT | OCF | FALSE | → AFT0 | None | (One Any FT Access) |
| Else GO TO "FAULT" State | | | | | |

TSD0 State After Two Stack Data Value "TSD" Op-Code: #0Ahex

Only a Read Stack Data Value memory location, or a Write to a Stack Not Current memory location is expected, and the ASBP code is updated.

| ASBP Code | CPU's Status | "Plus One" | Next State | Up-Date | |
|---|---|---|---|---|---|
| STD | MRD | FALSE | → TSD1 | SNC | (Second Read next) |
| SNC | MWR | FALSE | → TSD2 | STD | (Second Write next) |
| Else GO TO "FAULT" State | | | | | |

TSD1 State After "TSD" Op-Code, & a Stack Data Read: #0Bhex

The last Read Stack Data Value memory location is expected, the ASBP code is updated to Stack Not Current, and the execution of the instruction is completed.

| ASBP Code | CPU's Status | "Plus One" | Next State | Up-Date | |
|---|---|---|---|---|---|
| STD | MRD | X | → OCOI | SNC | (Inst. Seq. Completed) |
| Else GO TO "FAULT" State | | | | | |

TSD2 State After "TSD" Op-Code, & a Stack Data Write: #0Chex

The last Write Stack Not Current memory location is expected, the ASBP code is updated to Stack Data Value, and the execution of the instruction is completed.

| ASBP Code | CPU's Status | "Plus One" | Next State | Up-Date | |
|---|---|---|---|---|---|
| SNC | MWR | X | → OCOI | STD | (Inst. Seq. Completed) |
| Else GO TO "FAULT" State | | | | | |

TCP0 State After Two Stack PC Values May be accessed Op-Code: #0Dhex

For a conditional Call or a Conditional Return Op-Code, the first access after the Op-Code is expected to be:

1. If "Plus One" is True, an Op-Code or Operand is expected. An Op-Code, if a conditional "RET" is not taken, or the first Operand of a conditional "CALL", or
2. If "Plus One" is False, a Stack PC Value Read access is expected (a conditional Return is taken.), and the ASBP code is updated to Not Current. State "TSP3" is used to test for the second (and last) Stack PC Value Read.

| ASBP Code | CPU's Status | "Plus One" | Next State | Up-Date | |
|---|---|---|---|---|---|
| STP | MRD | FALSE | → TSP3 | SNC | (A Return is taken) |
| OPR | MRD | TRUE | → TCP1 | None | (A Call First Operand) |
| AnyOC | INT | TRUE | → INT0 | None | (Interrupt) |
| NDA | OCF | TRUE | → NDA0 | None | (No Mem. Data Access) |
| DAE | OCF | TRUE | → DAE0 | None | (Mem. Data Access) |
| TSD | OCF | TRUE | → TSD0 | None | (Two Stk. Data) |
| TSP | OCF | TRUE | → TSP0 | None | (Two Stk. PC) |
| TCP | OCF | TRUE | → TCP0 | None | (Two Stk. PC maybe) |
| FCS | OCF | TRUE | → FCS0 | None | (4 Cur. Stk. Accesses) |
| DSD | OCF | TRUE | → DSD0 | None | (Des. Data Stk. Access) |

-continued

| ASBP Code | CPU's Status | "Plus One" | | Next State | Up-Date | |
|---|---|---|---|---|---|---|
| AFT | OCF | TRUE | → | AFT0 | None | ( One Any FT Access ) |
| | Else GO TO "FAULT" State | | | | | |

TCP1 State after "TCP" Op-Code & First Call Operand: #0Ehex

If "Plus One" is True after the First Conditional Call Operand is accessed the second (and last) Operand access is expected (the Call is taken).

If "Plus One" is False (the Call is not taken), an Op-Code access is expected.

| ASBP Code | CPU's Status | "Plus One" | | Next State | Up-Date | |
|---|---|---|---|---|---|---|
| OPR | MRD | TRUE | → | TCP2 | None | ( Second Call Operand ) |
| AnyOC | INT | FALSE | → | INT0 | None | ( Interrupt ) |
| NDA | OCF | FALSE | → | NDA0 | None | ( No Mem. Data Access ) |
| DAE | OCF | FALSE | → | DAE0 | None | ( Mem. Data Access ) |
| TSD | OCF | FALSE | → | TSD0 | None | ( Two Stk. Data ) |
| TCP | OCF | FALSE | → | TCP0 | None | ( Two Stk. PC maybe ) |
| FCS | OCF | FALSE | → | FCS0 | None | ( 4 Cur. Stk. Accesses ) |
| DSD | OCF | FALSE | → | DSD0 | None | ( Des. Data Stk. Access ) |
| AFT | OCF | FALSE | → | AFT0 | None | ( One Any FT Access ) |
| | Else GO TO "FAULT" State | | | | | |

TCP2 State after "TCP" Op-Code & Second Operand: #0Fhex

A Conditional Call is taken, a Write to a Stack Not Current memory location is expected, and the ASBP code is updated to Stack PC Value. State "TSP4" is used to test for the second Stack PC Value Write.

| ASBP Code | CPU's Status | "Plus One" | | Next State | Up-Date | |
|---|---|---|---|---|---|---|
| SNC | MWR | FALSE | → | TSP4 | STP | ( First PC Value Write ) |
| | Else GO TO "FAULT" State | | | | | |

TSP0 State After Two Stack PC Value "TSP" Op-Code: #10hex

If "Plus One" is True, an Operand Access is expected for the first Operand of a "CALL" instruction.

If "Plus One" is False, this State expects:
1. A Read Stack PC Value memory location by the execution of a "RET" instruction, and the ASBP code is updated to Stack Not Current, or
2. A Write to a Stack Not Current memory location by the execution of a "RST" instruction, and the ASBP code is updated to Stack PC Value.

| ASBP Code | CPU's Status | "Plus One" | | Next State | Up-Date | |
|---|---|---|---|---|---|---|
| OPR | MRD | TRUE | → | TSP1 | None | ( Call Instruction ) |
| STP | MRD | FALSE | → | TSP3 | SNC | ( "RET" or Designated "POP" Instruction ) |
| SNC | MWR | FALSE | → | TSP4 | STP | ( "RST" or designated "PUSH" Instruction ) |
| | Else GO TO "FAULT" State | | | | | |

TSP1 State After "TSP" Op-Code & an Operand: #11hex

Only an access for the second Operand for a "CALL" instruction is expected.

| ASBP Code | CPU's Status | "Plus One" | | Next State | Up-Date | |
|---|---|---|---|---|---|---|
| OPR | MRD | TRUE | → | TSP2 | None | ( Second Call Operand ) |
| | Else GO TO "FAULT" State | | | | | |

TSP2 State After "TSP" Op-Code, or "CALL" Interrupt & two Operands: #12hex

After both "CALL" Operands have been accessed, a Write to a Stack Not Current memory location is expected, and the ASBP code is updated to Stack PC Value.

| ASBP Code | CPU's Status | "Plus One" | Next State | Up-Date | |
|---|---|---|---|---|---|
| SNC | MRD | FALSE | → TSP4 | STP | (First Stack PC Write) |
| | Else GO TO "FAULT" State | | | | |

TSP3 State After "TSP" or "TCP" Op-Code, & Stack PC Read:#13hex

This State is used to test for the Last Read Stack Data PC memory location after an "TSP" or "TCP" type Op-Code.

| ASBP Code | CPU's Status | "Plus One" | Next State | Up-Date | |
|---|---|---|---|---|---|
| STP | MRD | X | → OCOI | SNC | (Inst. Seq. Completed) |
| | Else GO TO "FAULT" State | | | | |

TSP4 State After "TSP" or "TCP" Op-Code, & Stack PC Write: #14hex

This State is used to test for the Second Write to a Stack Not Current memory location after:
1. A "TSP" or "TCP" type Op-Code, or
2. An Interrupt.
The ASBP code is Updated to Stack PC Value.

| ASBP Code | CPU's Status | "Plus One" | Next State | Up-Date | |
|---|---|---|---|---|---|
| SNC | MWR | X | → OCOI | STP | (Instruction or Interrupt Sequence Completed) |
| | Else GO TO "FAULT" State | | | | |

FCS0 First of four Current Stack accesses: #15hex

This State and the following three States are used only by the "XTHL" (Exchange Top of Stack with HL)) Instruction.

Two Read accesses, followed by two Write accesses to Current Stack (STD or STP) memory locations are expected. The ASBP codes are not updated.

| ASBP Code | CPU's Status | "Plus One" | Next State | Up-Date |
|---|---|---|---|---|
| STD | MRD | FALSE | → FCS1 | None |
| STP | MRD | FALSE | → FCS1 | None |
| | Else GO TO "FAULT" State | | | |

FCS1 Second of four Current Stack Accesses: #16hex
Second Current Stack Read expected.

| ASBP Code | CPU's Status | "Plus One" | Next State | Up-Date |
|---|---|---|---|---|
| STD | MRD | X | → FCS2 | None |
| STP | MRD | X | → FCS2 | None |
| | Else GO TO "FAULT" State | | | |

FCS2 Third of four Current Stack accesses: #17hex
First Current Stack Write expected,

| ASBP Code | CPU's Status | "Plus One" | Next State | Up-Date |
|---|---|---|---|---|
| STD | MWR | X | → FCS3 | None |
| STP | MWR | X | → FCS3 | None |
| | Else GO TO "FAULT" State | | | |

FCS3 Last of four Current Stack accesses: #18hex
Last Current Stack Write expected.

| ASBP Code | CPU's Status | "Plus One" | Next State | Up-Date | |
|---|---|---|---|---|---|
| STD | MWR | X | → OCOI | None | (Inst. Seq. Completed) |
| STP | MWR | X | → OCOI | None | (Inst. Seq. Completed) |
| | Else GO TO "FAULT" State | | | | |

DSD0 State After Designated Stack Data access "DSD" Op-Code: #19hex

An access to a Stack Data Value Memory location is expected by designated register indirect Data memory access instruction.

If a Write access, the execution of the instruction is completed and an Op-Code is expected next.
If a Read access, the next memory access may be:
1. For Op-Code access, or
2. A Write to the same Stack Data Value memory location, if the instruction was a "INC M" or "DEC M".
Read or Write Expected.

| ASBP Code | CPU's Status | "Plus One" | Next State | Up-Date | |
|---|---|---|---|---|---|
| STD | MRD | FALSE | → DSD1 | None | (Possible Write Next) |
| STD | MWR | FALSE | → OCOI | None | (Inst. Seq. Completed) |
| | Else GO TO "FAULT" State | | | | |

DSD1 State After a "DSD" Op-Code & A Read Stack Date Value: #1Ahex

If not an Op-Code, a Write to the same Stack Data Value memory location just Read by an "INC M" or "DEC M" instruction is expected.

| ASBP Code | CPU's Status | "Plus One" | Next State | Up-Date | |
|---|---|---|---|---|---|
| STD | MWR | FALSE | → OCOI | None | ( Inst. Seq. Completed ) |
| AnyOC | INT | FALSE | → INT0 | None | ( Interrupt ) |
| NDA | OCF | FALSE | → NDA0 | None | ( No Mem. Data Access ) |
| DAE | OCF | FALSE | → DAE0 | None | ( Mem. Data Access ) |
| TSD | OCF | FALSE | → TSD0 | None | ( Two Stk. Data ) |
| TSP | OCF | FALSE | → TSP0 | None | ( Two Stk. PC ) |
| TCP | OCF | FALSE | → TCP0 | None | ( Two Stk. PC maybe ) |
| FCS | OCF | FALSE | → FCS0 | None | ( 4 Cur. Stk. Accesses ) |
| DSD | OCF | FALSE | → DSD0 | None | ( Des. Data Stk. Access ) |
| AFT | OCF | FALSE | → AFT0 | None | ( One Any FT Access ) |
| Else GO TO "FAULT" State | | | | | |

AFT0 State After Any Function Type "AFT" Op-Code: #1Bhex

A single Read Access to any memory location, or a Write access to any memory location, except Read Only Data, Operands, or Op-Code memory locations, is expected.

The "AFT" ASBP code is assigned to memory Read or Write register indirect instructions designated as expected to access any memory location, and the ASBP code is not updated.

| ASBP Code | CPU's Status | "Plus One" | Next State | Up-Date |
|---|---|---|---|---|
| AnyFT | MRD | FALSE | → OCOI | None | ( Inst. Seq. Completed ) |
| NUL | MWR | FALSE | → OCOI | None | ( Inst. Seq. Completed ) |
| DIN | MWR | FALSE | → OCOI | None | ( Inst. Seq. Completed ) |
| DNI | MWR | FALSE | → OCOI | None | ( Inst. Seq. Completed ) |
| SNC | MWR | FALSE | → OCOI | None | ( Inst. Seq. Completed ) |
| STD | MWR | FALSE | → OCOI | None | ( Inst. Seq. Completed ) |
| STP | MWR | FALSE | → OCOI | None | ( Inst. Seq. Completed ) |
| Else GO TO "FAULT" State | | | | | |

WFI State After a "HALT" CPU Status: #1Chex

Next CPU Status must be an Interrupt Acknowledge.

| ASBP Code | CPU's Status | "Plus One" | Next State | Up-Date |
|---|---|---|---|---|
| AnyOC | INT | FALSE | → INT0 | None |
| Else GO TO "FAULT" State | | | | |

INT0 First State After Interrupt Status: #1Dhex

If a "CALL" instruction Op-Code was inserted, a second and third interrupt Acknowledge Status is expected. If not, a Write to a Stack Not Current memory location is expected, and the ASBP code is updated to Stack PC Value.

| ASBP Code | CPU's Status | "Plus One" | Next State | Up-Date | |
|---|---|---|---|---|---|
| AnyOC | INT | FALSE | → INT1 | None | ( Call Operand ) |
| SNC | MWR | FALSE | → TSP4 | STP | ( RST Inserted or Internal Int. ) |
| Else GO TO "FAULT" State | | | | | |

INT1 State After Second Interrupt Acknowledge Status: #1Ehex

| ASBP Code | CPU's Status | "Plus One" | Next State | Up-Date | |
|---|---|---|---|---|---|
| AnyOC | INT | FALSE | → TSP2 | None | ( MS Call Add. ) |
| Else GO TO "FAULT" State | | | | | |

FAULT Memory Access Fault State: #1Fhex

Output Access Fault signal and stay In this State Until Reset.

While several embodiments of this invention have been described, other embodiments of this invention will be obvious in view of this disclosure to those skilled in the art.

What is claimed is:

1. A system for generating an early indication of a fault in the operation of a computer program due, for example, to a coding error, or a fault in the operation of a computer based dedicated controller due to an error in its construction, design, programming, or due, for example, to a failed component, before the fault results in the generation of an incorrect output, said system comprising:

means for monitoring output signals of a CPU of a data processing system under test;

means for independently assigning to each and every location in a computer's memory space one code selected from a set of three or more codes, the code defining at least one condition which, if true when the memory location is accessed during the program's execution, is an indication of a fault in the operation of the program or controller;

means for determining, on every access to a memory location during the program's execution, if the condition, defined by the code assigned to the memory location, is true when the memory location is being accessed; and means for generating an output indicating whether the condition is true.

2. A system according to claim 1, wherein the means for assigning comprises a memory containing a location for each location in the computer's memory space, addressed by the CPU's Address bus.

3. A system according to claim 1, wherein the means for determining comprises a combinational logic circuit that, on every access to a memory location during the program's execution, generates an output indicating whether the condition is true, as a function of:

the code assigned to the memory location accessed; and the Control/Status signals generated by the CPU.

4. A system according to claim 1, wherein said means for determining comprises a state machine logic circuit that, on every access to a memory location during the program's execution, selects a next state of the state machine, and generates an output indicating whether the condition is true, as a function of:

the state machine's present state;

the code assigned to the memory location accessed; and the Control/Status signals from the CPU.

5. A system according to claim 1, further comprising means for changing said code assigned to a memory location when, as a result of the program's execution, the condition changes which, if true when said memory location is accessed during the program's execution, is an indication of a fault in the operation of the program or controller.

6. A system according to claim 5, wherein said means for determining and said means for changing are a combinational logic circuit that, on every access to a memory location, determines a fault output signal as a function of said code and said Control/Status signals, and, if a code change is indicated by said fault output signal, selects a new code and assigns the new code to said memory location.

7. A system according to claim 5, wherein said means for determining and said means for changing are a state machine logic circuit that, on every access to a memory location, determines a fault output signal and selects the state machine's next state as a function of said state machine's present state, said code and said Control/Status signals, and, if a code change is indicated by said fault output signal, selects a new code and assigns the new code to said memory location.

8. A system for generating an early indication of a fault in the operation of a computer program due, for example, to a coding error, or a fault in the operation of a computer based dedicated controller due, for example, to an error in its construction, design, programming, or due to a failed component, before the fault results in the generation of an incorrect output from the computer, said system comprising:

(a) means for assigning, to each location in the computer's memory space, a code indicating when the memory location is expected to be accessed during the program's execution;

(b) means for generating a truncated numerical difference between the present memory address and the previous memory address;

(c) means for determining, when a memory location is accessed during the program's execution, if the access to the memory location was expected, as a function of:

the code assigned to the memory location accessed;

the Control/Status signals generated by the CPU when the memory location is accessed; and the truncated numerical difference between the present memory address and the previous memory address; and (d) means for generating an output indicating that the access to the memory location is unexpected.

9. A system according to claim 8, wherein said means for assigning is a memory containing a location for each location in the computer's memory space addressed by the CPU's Address bus.

10. A system according to claim 8, wherein the truncated numerical difference between the present memory address and the previous memory address generated by the means for generating is a single logic signal indicating if the present memory address is one greater than the previous memory address.

11. A system according to claim 8, wherein said means for determining is provided by a combinational logic circuit that generates an output indicating if the access to the memory location is unexpected, as a function of:

the present code assigned to the memory location being accessed by the CPU;

the present Control/Status signals generated by the CPU; and the present truncated numerical difference between the present memory address and the previous memory address.

12. A system according to claim 8, wherein said means for determining is provided by a sequential logic circuit that generates an output indicating if the access to the memory location is unexpected, as a function of:

the present and past codes assigned to the memory locations being accessed by the CPU;

the present and past Control/Status signals generated by the CPU; and the present and past truncated numerical differences between the present memory address and the previous memory address.

13. A system according to claim 8, further comprising means for changing said code assigned to a memory location when, as a result of the program's execution, the expectation changes regarding when said memory location is expected to be accessed.

14. A system according to claim 13, wherein said means for determining and said means for changing are a combinational logic circuit that, on every access to a memory location, determines a fault output signal as a function of said code and said Control/Status signals, and, if a code change is indicated, selects a new code and assigns the new code to said memory location.

15. A system according to claim 13, wherein said means for determining and said means for changing are a state machine logic circuit that, on every access to a memory location, determines a fault output signal and selects the state machine's next state as a function of said state machine's present state, said code and said Control/Status signals, and, if a code change is indicated, selects a new code and assigns the new code to said memory location.

16. A system for generating an early indication of a fault in the operation of a computer program due, for example, to a coding error, or a fault in the operation of a computer based dedicated controller due, for example, to an error in its construction, design, programming, or due to a failed component or noise, before the fault results in the generation of an incorrect output from the computer, said system comprising:
(a) means for assigning, to each location in the computer's memory space, a code indicating when the memory location is expected to be accessed during the program's execution;
(b) first means for generating a truncated numerical difference between a present memory address and a previous memory address;
(c) second means for generating a truncated numerical difference between the present memory address and the previous memory address used to access a memory location assigned an instruction Op-Code or Operand;
(d) means for determining, when a memory location is accessed during the program's execution, if the access to the memory location was expected, as a function of:
the code assigned to the memory location accessed;
the Control/Status signals generated by the CPU when the memory location is accessed;
the truncated numerical difference between the present memory address and the previous memory address; and
the truncated numerical difference between the present memory address and the previous memory address used to access a memory location assigned an instruction Op-Code or Operand; and
(e) means for generating an output indicating if the access to the memory location is unexpected.

17. A system according to claim 16, wherein the means for assigning comprises a memory containing a location for each location in the computer's memory space addressed by the CPU's Address bus.

18. A system according to claim 16 wherein the truncated numerical difference between the present memory address, and the previous memory address generated by the first means for generating is a single logic signal indicating if the present memory address is one greater than the previous memory address.

19. A system according to claim 16 wherein the truncated numerical difference between the present memory address and the previous memory address used to access an instruction Op-Code or operand generated by the second means for generating is a single logic signal indicating if the present memory address is one greater than the previous memory address used to access an instruction Op-Code or Operand.

20. A system according to claim 16, wherein the means for determining is provided by a combinational logic circuit that generates an output indicating if the access to the memory location is expected, as a function of only:
the present code assigned to the memory location accessed by the CPU;
the present Control/Status signals generated by the CPU;
the present truncated numerical difference between the present memory address and the previous memory address; and
the present truncated numerical difference between the present memory address and the previous memory address used to access a memory location assigned an instruction Op-Code or Operand.

21. A system according to claim 16, wherein the means for determining is provided by a sequential logic circuit that generates an output indicating if the access to the memory location is expected, as a function of:
the present and past codes;
the present and past Control/Status signals generated by the CPU;
the present and past truncated numerical difference between the present memory address and the previous memory address; and
the present and past truncated numerical difference between the present memory address and the previous memory address used to access a memory location assigned an instruction Op-Code or Operand.

22. A method of generating an early indication of a fault in the operation of a computer program due, for example, to a coding error, or a fault in the operation of a computer based dedicated controller due, for example, to an error in its construction, design, programming, or due to a failed component, before the fault results in the generation of an incorrect output from the computer, said method comprising the steps of:
assigning, to each location in the computer's memory space, a code selected from a set of three or more codes, the code defining at least one condition which, if true when the memory location is accessed during the program's execution, is an indication of a fault in the operation of the program or controller;
determining, on every access to a memory location during the program's execution, if the condition specified by the code assigned to the memory location accessed is true; and
generating an output indicating that the memory location is accessed incorrectly if the condition specified by the code is true.

23. A method according to claim 22, further comprising changing said code assigned to a memory location when, as a result of the program's execution, the condition changes which, if true when said memory location is accessed during the program's execution, is an indication of a fault in the operation of the program or controller.

24. A method according to claim 23, wherein said step of determining and said step of changing are performed by a combinational logic circuit.

25. A method according to claim 23, wherein said step of determining and said step of changing are performed by a state machine logic circuit.

* * * * *